US010548168B2

(12) United States Patent
Park et al.

(10) Patent No.: US 10,548,168 B2
(45) Date of Patent: Jan. 28, 2020

(54) METHOD FOR RANDOM ACCESS IN WIRELESS COMMUNICATION SYSTEM AND APPARATUS FOR THE SAME

(71) Applicant: ELECTRONICS AND TELECOMMUNICATIONS RESEARCH INSTITUTE, Daejeon (KR)

(72) Inventors: Ji Soo Park, Daejeon (KR); Kyung Yeol Sohn, Daejeon (KR); Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/828,328

(22) Filed: Nov. 30, 2017

(65) Prior Publication Data

US 2018/0220466 A1    Aug. 2, 2018

(30) Foreign Application Priority Data

Dec. 1, 2016  (KR) .................. 10-2016-0162932
Nov. 30, 2017  (KR) .................. 10-2017-0162470

(51) Int. Cl.
*H04W 72/04* (2009.01)
*H04W 74/08* (2009.01)
*H04W 92/20* (2009.01)

(52) U.S. Cl.
CPC ..... *H04W 74/0833* (2013.01); *H04W 72/0446* (2013.01); *H04W 92/20* (2013.01)

(58) Field of Classification Search
CPC ......... H04W 72/0446; H04W 74/0833; H04W 72/0413; H04W 72/12; H04W 74/006; H04W 74/08; H04W 74/008
See application file for complete search history.

(56) References Cited

U.S. PATENT DOCUMENTS

| | | |
|---|---|---|
| 6,597,675 B1 | 7/2003 | Esmailzadeh et al. |
| 7,512,109 B2 | 3/2009 | Trott et al. |
| 8,416,718 B2 | 4/2013 | Hao et al. |
| 8,620,367 B2 | 12/2013 | Jeong et al. |
| 8,767,585 B2 | 7/2014 | Pelletier et al. |
| 9,380,606 B2 | 6/2016 | Zou et al. |
| 9,538,554 B2 | 1/2017 | Kim et al. |
| 2003/0095528 A1* | 5/2003 | Halton ............ H04W 74/0833 370/342 |
| 2006/0274843 A1 | 12/2006 | Koo et al. |

(Continued)

*Primary Examiner* — Mohamed A Kamara
(74) *Attorney, Agent, or Firm* — Rabin & Berdo, P.C.

(57) ABSTRACT

Disclosed are a random access method and a random access apparatus in a wireless communication system. An operation method of a terminal in a communication system, according to the present invention, comprises receiving system information including configuration information on a physical random access channel (PRACH) composed of a plurality of access slots from a first base station; selecting one access slot among the plurality of access slots based on the configuration information; and transmitting a random access preamble to the first base station through the one access slot. Therefore, the capacity of the random access channel can be increased without further occupation of radio resources.

19 Claims, 14 Drawing Sheets

(56) References Cited

U.S. PATENT DOCUMENTS

| | | | |
|---|---|---|---|
| 2009/0170514 A1* | 7/2009 | Yokoyama | H04W 72/085 |
| | | | 455/436 |
| 2010/0172299 A1* | 7/2010 | Fischer | H04W 74/002 |
| | | | 370/328 |
| 2010/0284289 A1* | 11/2010 | Suo | H04W 56/002 |
| | | | 370/252 |
| 2015/0117374 A1* | 4/2015 | Wu | H04W 74/0833 |
| | | | 370/329 |
| 2016/0198495 A1* | 7/2016 | Noh | H04W 74/006 |
| | | | 370/336 |
| 2016/0381713 A1 | 12/2016 | Hwang | |
| 2018/0042050 A1* | 2/2018 | Kim | H04W 88/08 |
| 2018/0213427 A1* | 7/2018 | Uemura | H04W 24/10 |

\* cited by examiner

RA Preamble Format A

RA Preamble Format B

RA Preamble Format C

RA Preamble Format D

METHOD FOR RANDOM ACCESS IN WIRELESS COMMUNICATION SYSTEM AND APPARATUS FOR THE SAME

CROSS-REFERENCE TO RELATED APPLICATIONS

This application claims priorities to Korean Patent Applications No. 10-2016-0162932 filed on Dec. 1, 2016 and No. 10-2017-0162470 filed on Nov. 30, 2017 in the Korean Intellectual Property Office (KIPO), the entire contents of which are hereby incorporated by reference.

BACKGROUND

1. Technical Field

The present disclosure relates to a random access technique in a wireless communication system, and more specifically, to a method of configuring multiple slots in a random access channel and a random access method using the same.

2. Related Art

A terminal attempting voice and/or data communication in a mobile communication system using limited radio resources may request a base station to establish a connection through a process called a random access. The random access may be generally used for the following purposes. First, it may be used to form a radio link as an initial access. Second, it may be used to re-form a radio link after a radio link failure (RLF). Third, it may be used to re-establish a radio link after a radio link failure (RLF). Fourth, it may be used for uplink synchronization with a new cell in a handover procedure. Fifth, when a terminal is in an RRC_CONNECTED state but its uplink is not synchronized, it may be used to acquire an uplink synchronization with a base station due to arrival of uplink or downlink data. Sixth, it may be used for making a scheduling request (SR) when there is no scheduling request resource designated on a physical uplink control channel (PUCCH).

Also, random access preambles transmitted from a plurality of terminals to a base station may collide with each other when the plurality of terminals attempt respective random accesses at the same time, so that the random access procedure may not be performed smoothly. In order to resolve this problem, a method of operating multiple random access channels for increasing random access opportunities may be used, but more radio resources are required as many as the number of radio channels required for their uses. Also, in an environment in which the number of terminals such as the Internet of Things (hereinafter referred to as 'IoT') terminals, which is becoming a major issue in the 5G mobile communication system, is increased, further more random access resources are required. Therefore, improvement of a random access method is needed.

SUMMARY

Accordingly, embodiments of the present disclosure provide a method of operating a multi-random access channels without using radio resources as conventional.

Accordingly, embodiments of the present disclosure provide a random access method for enabling a random access procedure to be reliably operated in accordance with various communication environments and usage purposes.

In order to achieve the objective of the present disclosure, an operation method of a terminal in a communication system according to a first embodiment of the present invention may comprise receiving system information including configuration information on a physical random access channel (PRACH) composed of a plurality of access slots from a first base station; selecting one access slot among the plurality of access slots based on the configuration information; and transmitting a random access preamble to the first base station through the one access slot. Here, the plurality of access slots are used for transmission of random access preambles and configured to be overlapped in the PRACH.

The operation method may further comprise receiving a random access response from the first base station in response to the random access preamble; and transmitting a signaling message to the first base station by referring to the random access response.

The configuration information may include, for each of at least one among an omni-directional beam, a sector beam, and a spot beam, a physical resource allocation information for a PRACH and information on configuration of a plurality of access slots within the PRACH.

The configuration information may further include information indicating formats of the random access preambles transmitted through the plurality of access slots.

The configuration may information further include information indicating starting positions of the plurality of access slots and offsets indicating differences between the starting positions of the plurality of access slots.

The offset may be allocated to be equal to or larger than a cyclic shift offset, and the cyclic shift offset is a sum of a time allocated to guard samples, a round trip delay time at a coverage edge of the first base station, and a maximum delay spread time at the coverage edge of the first base station.

The configuration information may further include a cyclic shift offset of a preamble sequence applied to the random access preamble.

The configuration information may further include information indicating ending positions of the plurality of access slots.

The starting positions and the ending positions of the plurality of slots may be determined based on the offsets and an occupation length of a random access preamble applied to the plurality of access slots.

When the first base station supports a plurality of beams, the configuration information on the PRACH may further include information indicating access slots mapped to each of the plurality of beams.

The configuration information on the PRACH may be configured through coordination of the first base station and a second base station, and used commonly by the first base station and second base station.

In order to achieve the objective of the present disclosure, an operation method of a first base station in a communication system according to a second embodiment of the present invention may comprise generating system information including configuration information on a physical random access channel (PRACH) composed of a plurality of access slots; broadcasting the system information; and receiving a random access preamble through each of the plurality of access slots from a terminal. Here, the plurality of access slots are used for transmission of random access preambles and configured to be overlapped in the PRACH.

The configuration information may include, for each of at least one among an omni-directional beam, a sector beam, and a spot beam, a physical resource allocation information for a PRACH and information on configuration of a plurality of access slots within the PRACH.

The configuration information may further include information indicating formats of the random access preambles transmitted through the plurality of access slots.

The configuration may information further include information indicating starting positions of the plurality of access slots and offsets indicating differences between the starting positions of the plurality of access slots.

The offset may be allocated to be equal to or larger than a cyclic shift offset, and the cyclic shift offset is a sum of a time allocated to guard samples, a round trip delay time at a coverage edge of the first base station, and a maximum delay spread time at the coverage edge of the first base station.

The configuration information may further include information indicating ending positions of the plurality of access slots.

When the first base station supports a plurality of beams, the configuration information on the PRACH may further include information indicating access slots mapped to each of the plurality of beams.

The configuration information on the PRACH may be configured through coordination of the first base station and a second base station, and used commonly by the first base station and second base station.

According to the present invention, a plurality of random access preambles can be transmitted in one PRACH without increasing radio resource consumption in the mobile communication system, thereby reducing delay time due to random access and increasing reliability. Also, due to the effect of increasing the capacity of the PRACH, it is possible to simultaneously accommodate a plurality of random access preamble formats in the PRACH, thereby supporting random access attempts in various radio environments of the terminal.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
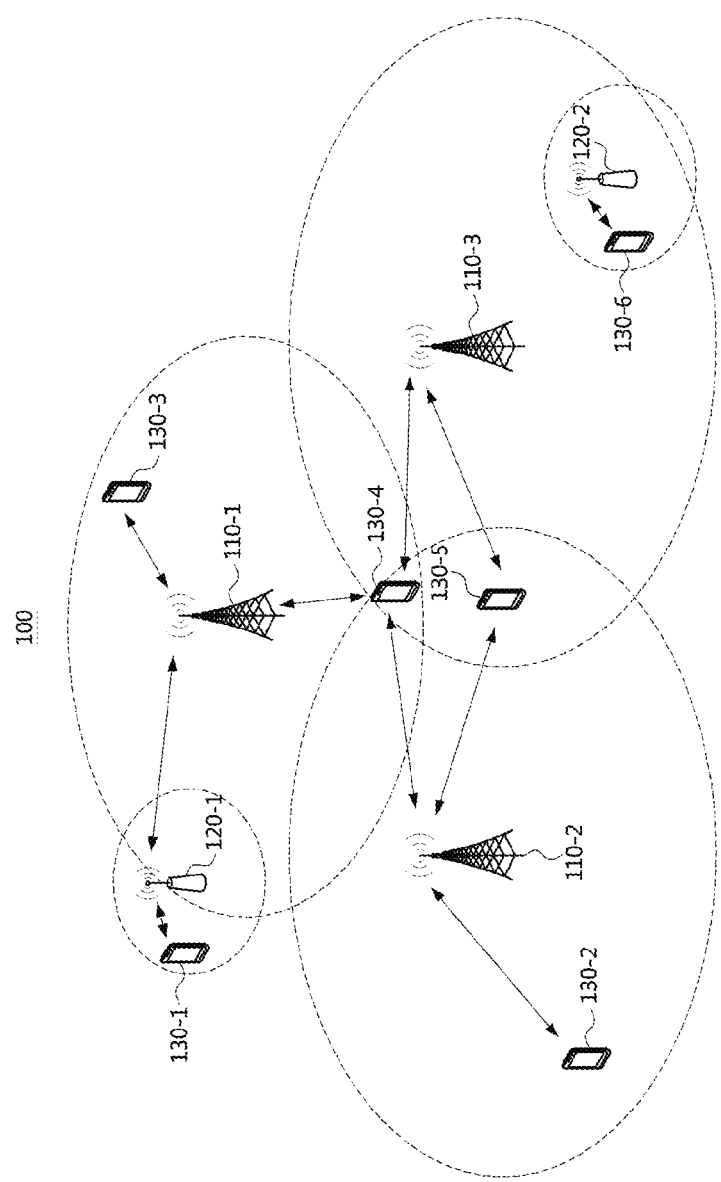
FIG. 1 is a conceptual diagram illustrating a first embodiment of a cellular communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a cellular communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may comprise a core network (e.g., a serving gateway (S-GW), a packet data network (PDN) gateway (P-GW), a mobility management entity (MME), and the like).

The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
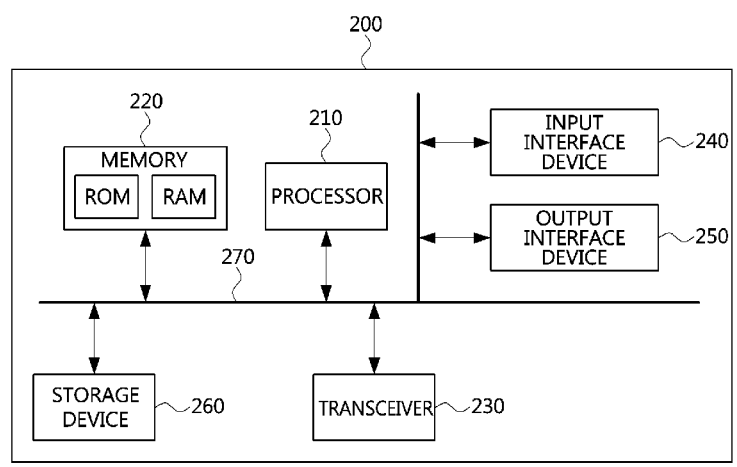
FIG. 2 is a block diagram illustrating a first embodiment of a communication node constituting a cellular communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Next, random access techniques in a wireless communication system will be described. Here, even when a method (e.g., transmission or reception of a signal) to be performed in the first communication node among communication nodes is described, the corresponding second communication node may perform a method (e.g., reception or transmission of the signal) corresponding to the method performed in the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

A transport channel, which is an upper layer of a physical layer used in a random access procedure in 3GPP LTE and LTE-A, is a random access channel (hereinafter, referred to as 'RACH'), and a physical channel of the RACH, which is mapped to a physical layer through a radio resource allocated to a time and frequency domain, is a physical random access channel (hereinafter, referred to as 'PRACH'). In a random access procedure in which the terminal performs an initial timing synchronization with the base station, a power control, an uplink resource request, a handover, and the like in order to access the base station, the RACH may be used as an uplink control channel through which the terminal transmits a random access preamble.

The random access procedure may be initialized by the base station, and the terminal may transmit a random access preamble to the base station. The base station may then transmit a random access response to the terminal in response to the random access preamble. Then, the terminal and the base station may exchange an uplink data channel such as an uplink shared channel (UL-SCH) including signaling information and a downlink data channel such as a downlink shared channel (DL-SCH), and establish a radio link according to a requirement of the terminal.

The random access preambles transmitted from a plurality of terminals to the base station may collide with each other during the random access procedure performed by the plurality of terminals, so that the random access procedure may not be performed successfully. In order to reduce the probability of such the collision, in the mobile communication system such as LTE, the number of slots (or subframes) used for the random access may be increased in time domain, or the number of radio resources used for the random access channel may be increased in frequency domain to increase successful random access opportunities of the terminals. Through the multi-channel random access operation, it may be possible to reduce the collision probability between the random access preambles transmitted by the plurality of terminals, thereby reducing access delays of the terminals to the base station. Hereinafter, this will be described in detail.

Figure 3:
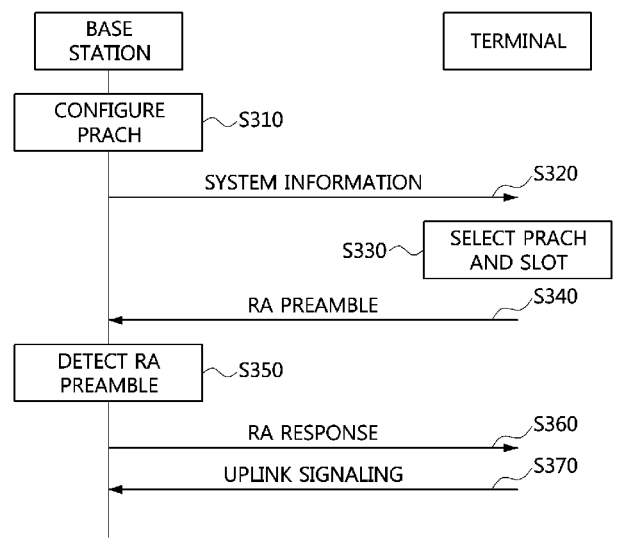
FIG. 3 is a sequence chart illustrating a random access procedure according to an embodiment of the present disclosure.

FIG. 3 is a sequence chart illustrating a random access procedure according to an embodiment of the present disclosure.

Referring to FIG. 3, in order to communicate with a mobile communication network through a base station, a terminal may perform a cell search process to synchronize with a neighbor base station, and receive system information from the base station. Then, the terminal may perform communications using a radio resource (RB) allocated through a random access procedure to the base station based on the received system information. A cell is an area managed by a base station in the mobile communication network and may vary in size depending on a transmission signal strength of the base station. A cell may be subdivided into sectors. A communication service may be provided to the entire cell through a single antenna, or the cell may be divided into sectors using a plurality of antennas to provide a communication service for each sector by each of the plurality of antennas. Each process will be described in detail below.

First, the base station may generate and configure system information including random access information (e.g., PRACH configuration related information, etc.) available to a terminal attempting to perform a random access to the base station (S310). Then, the terminal attempting a random access may receive the system information including the random access information transmitted by the base station (S320). The system information may be information repeatedly broadcasted by the base station and may include information that the terminal should know in order to access the base station. Specifically, the system information may include information necessary for the terminal to operate in the mobile communication network and the cell managed by the base station, such as information on downlink and uplink cell bandwidth, random access-related detailed information, and uplink power control. The random access-related detailed information may include a PRACH radio resource occupation length, a preamble format that can be transmitted and received in each random access slot, and information on a Zadoff-chu (ZC) sequence required to generate random access preambles to be described later.

Meanwhile, in the random access procedure supported by 3GPP LTE and LTE-A, a random access preamble is used. The random access preamble may be used for the terminal to notify the base station of a random access attempt from the terminal and allow the base station to estimate a delay between the terminal and the base station so that the terminal adjusts its uplink timing based on the estimated delay. The random access preamble may be transmitted through the PRACH transmitted from the terminal to the base station. The base station may transmit information on which time-frequency resources are used for the transmission of the random access preamble to the terminal through the system information.

The terminal attempting the random access may select one random access preamble to be transmitted through the PRACH using the system information (S330). The one or more cells operated by the base station may have a plurality of available random access preamble sequences. For example, there are 64 available random access preamble sequences for 3GPP LTE and LTE-A. In the following description, it is assumed that there are 64 random access preamble sequences. However, embodiments of the present disclosure are not limited thereto, and the number of available sequences may vary depending on operation environments of the mobile communication system. The 64 available random access preamble sequences may be divided into at least one subset. Hereinafter, subsets of the random access preamble sequences will be described.

Figure 4:
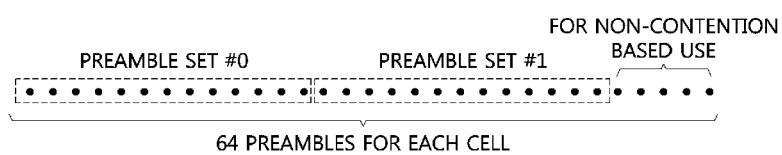
FIG. 4 is a conceptual diagram illustrating subsets of random access preamble sequences applied to a random access preamble according to an embodiment of the present disclosure.

FIG. 4 is a conceptual diagram illustrating subsets of random access preamble sequences applied to a random access preamble according to an embodiment of the present disclosure.

Referring to FIG. 4, two subsets may be defined for 64 random access preamble sequences, and information on each subset of the random access preamble sequences may be transmitted to the terminal as a part of the system information.

When performing a contention-based random access attempt as described below, the terminal may randomly select one random access preamble sequence in one of the two subsets shown in FIG. 4. The terminal may transmit a random access preamble using the selected random access preamble sequence to the base station (S340). The subset of the random access preamble sequence may be determined according to the amount of data to be transmitted by the terminal over an uplink data channel (e.g., PUSCH) including uplink signaling information, which is a step after a random access response from the base station to the terminal, or according to a power that the terminal is allowed to use for transmission in terms of power. Therefore, the base station may obtain reference information on how much uplink resources the base station will grant to the terminal through the random access preamble transmitted by the terminal. Hereinafter, allocation of a radio resource used for the random access will be described.

Figure 5:
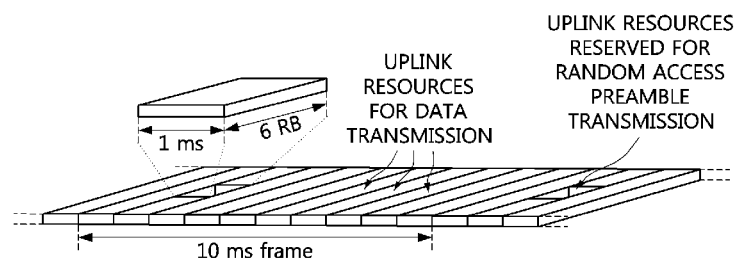
FIG. 5 is a conceptual diagram illustrating resource allocation for random access transmission according to an embodiment of the present disclosure.

FIG. 5 is a conceptual diagram illustrating resource allocation for random access transmission according to an embodiment of the present disclosure.

Referring to FIG. 5, the PRACH resource in frequency domain may have a bandwidth corresponding to 6 RBs (1.08 MHz). This is a bandwidth corresponding to a minimum uplink cell bandwidth over which an LTE system can operate. Therefore, the same random access preamble structure may be used regardless of a transmission bandwidth in the cell. The length of the random access preamble region in time domain may be changed according to a random access preamble configuration to be described later. The basic random access resource may be 1 ms, but a longer random access preamble may be used. Also, an arbitrary long random access region may be used in the mobile communication system in a manner that an uplink scheduler of the base station does not schedule terminals in a plurality of consecutive subframes. In general, the base station may not schedule another uplink transmission (e.g., user data or control information) to a time-frequency resource used for the random access, and thus a random access preamble transmitted in the time-frequency resource used for the random access may have orthogonality with the user data. Thus, the base station may avoid interferences between uplink data transmission and random access attempts received from different terminals.

When operating in the FDD transmission mode of 3GPP LTE and LTE-A, there may be at most one random access region per subframe. That is, a plurality of random access attempts are not multiplexed in frequency domain. This is because it is advantageous to spread random access opportunities in several points in time domain in order to minimize an average waiting time until a start of a random access attempt. On the other hand, when operating in the TDD transmission mode of 3GPP LTE and LTE-A, a plurality of random access regions may be configured in a single subframe. This is because frequency-domain multiplexing is sometimes necessary in order to maintain the same random access capacity as in the FDD transmission mode because the number of uplink subframes is generally smaller per frame in the TDD transmission mode. For example, in the case of the FDD transmission mode of 3GPP LTE and LTE-A, the number of random access regions may be set from 1 per 20 ms to 1 per 1 ms. Also, in the case of the TDD transmission mode, at most 6 attempts may be configured for each 10 ms frame. Hereinafter, a structure of the random access preamble will be described.

Figure 6:
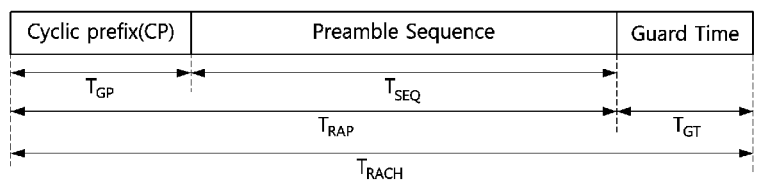
FIG. 6 is a conceptual diagram illustrating a random access preamble structure according to an embodiment of the present disclosure.

FIG. 6 is a conceptual diagram illustrating a random access preamble structure according to an embodiment of the present disclosure.

Referring to FIG. 6, a random access preamble format may be configured so that a radio resource occupation time mapped to one PRACH radio resource in a mobile communication system is $T_{RACH}$. $T_{SEQ}$ denotes a preamble sequence occupation time, $T_{CP}$ denotes an occupation time (i.e., CP duration) of a cyclic prefix (hereinafter, referred to as 'CP') generated from the preamble sequence, and $T_{GT}$ denotes an occupation time of a guard time interval. $T_{RAP}$ is an occupation time of the random access preamble, which is a sum of the preamble sequence occupation time and the occupation time of the CP.

In order to support random access types in various radio channel environments of the terminal and to increase a success ratio of the random access, in the transmission and reception of the random access preamble within a frame or a subframe, a transmission opportunity of the random access preamble in time domain and a radio resource position of the random access preamble in frequency domain may be variously configured to define the physical random access channel (PRACH).

One or more random access preamble formats may be defined, one of the random access preamble formats may be selected, and the selected random access preamble format may be used as being mapped to one PRACH. The base station may transmit system information including the PRACH configuration information for each cell to terminals located in each cell.

The length (i.e., PRACH occupation time length) of a transmission period of the random access preamble signal may be determined according to a radius R of the cell, and the length ($T_{SEQ}$) of the random access preamble sequence and the length ($T_{CP}$) of the CP obtained through the corresponding sequence may be determined. Also, $T_{RACH}$ in the physical layer may be one to three subframes in length depending on the format of the random access preamble. In addition to $T_{CP}$ and $T_{SEQ}$, $T_{GT}$, which is the guard time interval, may be included in $T_{RACH}$. $T_{GT}$ may be allocated for random access preamble transmission/reception protection to avoid interference with neighboring subframes not used for the random access considering a maximum round trip propagation time due to the cell radius (i.e., a round trip delay time at cell edge ($T_{RTDCE}$=2×R/(3×10$^8$))) and a maximum delay spread (hereinafter, referred to as 'MDS') time $T_{MDS}$ according to channel characteristics.

Referring again to FIG. 3, the base station receiving the random access preamble from the terminal in the previous step (S340) may detect the random access attempt from the terminal since random access attempts between different terminals do not collide with each other unless the different terminals attempt random accesses using the same random access preamble sequence at the same time (S350).

If the base station successfully detects the random access preamble sequence from the random access preamble, the base station may transmit a random access response (RAR) including uplink timing adjustment information (i.e., a timing advance ('TA')) required for uplink synchronization to the terminal (S360). The terminal may adjust its uplink timing based on the received RAR and transmit an uplink signaling message to the base station through a predetermined uplink radio resource (S370).

Through the random access procedure, the terminal may establish a call to the base station. The random access preamble structure applied to the embodiment of FIG. 3 may have various modifications according to a cell structure and a radio channel environment. Hereinafter, a random access preamble format, which is a variation of the random access preamble structure, will be described.

Figure 7:
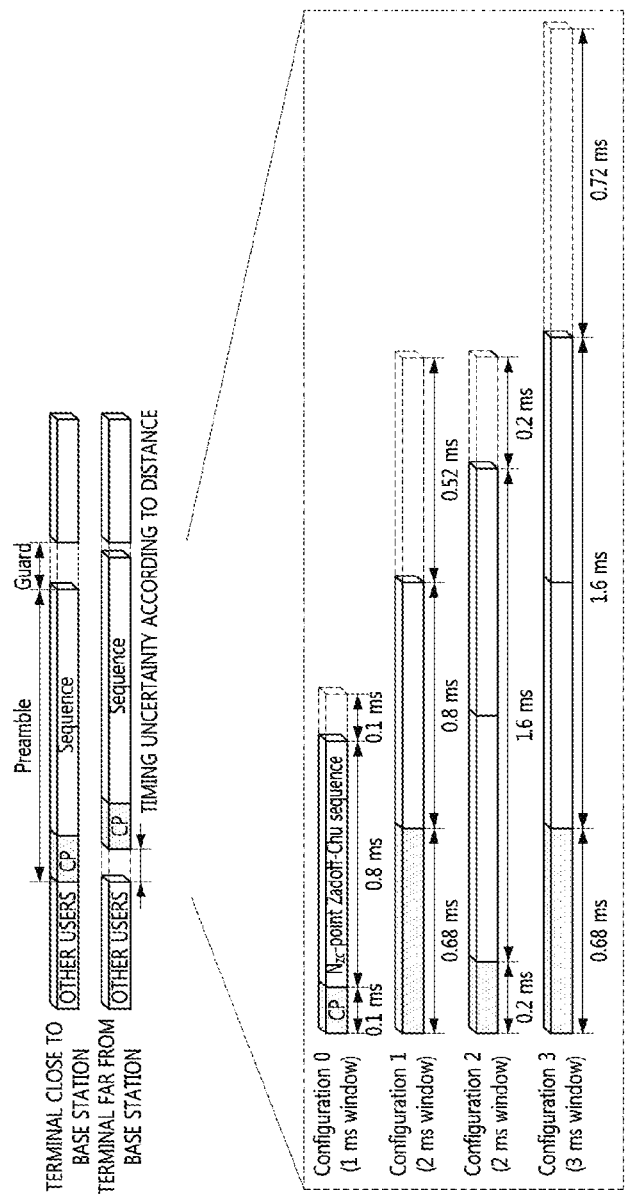
FIG. 7 is a conceptual diagram of random access preamble formats according to an embodiment of the present disclosure.

FIG. 7 is a conceptual diagram of random access preamble formats according to an embodiment of the present disclosure.

Referring to FIG. 7, when a random access preamble includes a CP, the base station may perform frequency domain processing with low complexity. The length of the CP may be configured to be equal to the length of the guard time interval, and the CP of 0.1 ms and the guard time interval of 0.1 ms may be allocated for the random access preamble sequence having the length of about 0.8 ms. In this case, a cell radius of up to about 15 km may be supported, and a configuration 0 shown in FIG. 7 may represent such the case. Other configurations (configurations 1 to 3) shown in FIG. 7 may be used for larger cells with larger uplink timing uncertainty. Some of these configurations may make the random access preamble sequence itself longer and increase a receiving energy of the random access preamble in a receiving side detector so that the mobile communication system can support larger cells. The random access preamble formats of FIG. 7 may be applied to both the FDD transmission mode and the TDD transmission mode. Also, in the TDD transmission mode, it is possible to configure additional random access preambles only for the TDD transmission mode, and the random access preamble may not be transmitted in a normal subframe but in an Uplink Pilot Time Slot (UpPTS) field of a special subframe of the LTE system. Hereinafter, the random access preamble sequence will be described.

As the random access preamble sequence, a Zadoff-Chu sequence having a periodic auto-correlation property may be used. However, any sequence having the property of the Zadoff-Chu sequence may also be used. More specifically, the Zadoff-Chu sequence applied to the random access preamble may be generated through a time-domain cyclic shift of a u-th root Zadoff-Chu sequence. That is, the u-th root Zadoff-Chu sequence described in Equation 1 may be cyclic-shifted by $N_{CS}$ as in Equation 2 so that $\lfloor N_{ZC}/N_{CS} \rfloor$ random access preamble sequences are generated. Here, $N_{ZC}$ may represent the length of the random access preamble sequence as the length of the Zadoff-Chu sequence. $N_{CS}$ may represent the unit length of the cyclic shift for the Zadoff-Chu sequence. The $N_{CS}$ may be determined so as to overcome an error range in uplink timing adjustment at a reception side due to a propagation distance at a cell edge or a spot beam edge.

$C_V$ may be a value determined by $N_{CS}$, and may be a sequential cyclic shift value for distinguishing each cyclic-shifted random access preamble sequence so that the u-th root Zadoff-Chu sequence used for the random access preamble has periodic auto-correlation property.

The Zadoff-Chu sequence used as the random access preamble sequence has the following properties.

First, the Zadoff-Chu sequence has a constant amplitude. Second, the Zadoff-Chu sequence has zero circular auto-correlation. Third, the Zadoff-Chu sequence has a flat frequency domain response property. Fourth, the Zadoff-Chu sequence has a small circular cross-correlation with a different Zadoff-Chu sequence.

These properties depend on the periodic auto-correlation property of the Zadoff-Chu sequence, the circular correlation (or cross-correlation) value between Zadoff-Chu sequences having different cyclic shift values for any one Zadoff-Chu sequence is 0, and the circular correlation (or, auto-correlation) value between Zadoff-Chu sequences having the same cyclic shift value is not zero. These properties make it possible to create a zero correlation zone (ZCZ) between Zadoff-Chu sequences. If a time synchronization failure due to misalignment between Zadoff-Chu sequences can be overcome, orthogonality of the Zadoff-Chu sequences can be maintained within an adjustment error range of the time synchronization that corresponds to acquisition of the Zadoff-Chu sequences received within the $N_{CS}$ range. As a result, the base station can detect the random access preamble sequence.

Also, the Zadoff-Chu sequence has small variation in the time domain and has good power amplification properties. Also, the channel estimation may be simplified in the receiver since it has a small variation even in the frequency domain. Also, the cross-correlation between the Zadoff-Chu sequences is small, resulting in less inter-cell interference. In 3GPP LTE and LTE-A, the Zadoff-Chu sequence is used as a primary synchronization signal, a reference signal in uplink and downlink, a physical uplink control channel (PUCCH), the random access preamble, and the like.

$$x_u(n) = e^{-j\frac{\pi u n(n+1)}{N_{ZC}}}, 0 \leq n \leq N_{ZC} - 1 \qquad \text{[Equation 1]}$$

$$x_{u,v}(n) = x_u((n + C_v) \bmod N_{ZC}) \text{ where } C_v = \qquad \text{[Equation 2]}$$

$$\begin{cases} vN_{CS} & v = 0, 1, \ldots, \lfloor N_{ZC}/N_{CS} \rfloor - 1, N_{CS} \neq 0 \\ 0 & N_{CS} = 0 \end{cases}$$

As described above, a random access preamble having a zero correlation zone with a length of ($N_{CS}$-1) may be generated through the sequential cyclic shift of the unit length of $N_{CS}$ by applying Equation 2 to the u-th root Zadoff-Chu sequence of Equation 1. From each root Zadoff-Chu sequence, $\lfloor N_{ZC}/N_{CS} \rfloor$ random access preambles which are cyclic-shifted by $N_{CS}$ in the time domain from $x_{u,v}(n)$ in Equation 2 may be generated.

The cyclic-shifted Zadoff-Chu sequence has several properties. For example, the amplitude of the cyclic-shifted sequences is equal to the amplitude of the original sequence, thus ensuring efficient use of a power amplifier and maintaining a low peak-to-average ratio (PAR) in the uplink. Also, since the cyclic-shifted sequences have ideal circular auto-correlation property, the base station may accurately estimate the timing of the random access preambles.

Equation 3 represents a lower bound of $N_{CS}$, which is a cyclic shift offset, which is the unit length of the cyclic shift used to generate the random access preambles.

$$N_{CS} \geq \left[(\text{Roundtrip delay} + \text{Maximum delay spred}) \times \frac{\text{sequence length}}{\text{sequence duration}}\right] + \text{Guard samples} \qquad \text{[Equation 3]}$$

$$N_{CS} \geq \left[((2 \times R/(3 \times 10^8)) + T_{MDS}) \times \frac{N_{SC}}{T_{SEQ}}\right] + n_S =$$

$$\left[(T_{RTDCE} + T_{MDS}) \times \frac{N_{ZC}}{T_{SEQ}}\right] + n_S$$

Here, $n_g$ represents guard samples required for improvement in performance when a pulse shaping filter is used at a receiving end.

If the value of $N_{CS}$ is larger than the sum of the maximum round trip time (i.e., the round trip propagation time which is the round trip delay time at cell edge ($T_{RTDCE}$)) of the cell and the maximum delay spread time $T_{MDS}$ of the channel represented in unit of samples, the cross-correlation between the random access preambles generated by the cyclic shifts from the same root Zadoff-Chu sequence becomes zero, and there is no interference between the random access preambles between the random access attempts using the corresponding random access preambles. Meanwhile, the $T_{MDS}$ value may be given as a constant for a radio environment, such as the size of the cell radius in general.

$N_{CS}$ may be variably set to effectively support cells of different sizes. For example, in a cell with a small radius, a larger number of sequences may be generated from a root Zadoff-Chu sequence by setting the cyclic shift length $N_{CS}$ to a smaller value. Alternatively, an arbitrary random access preamble sequence may be generated by changing the value of u which is the root value of the root Zadoff-Chu sequence. For this variable operation, the $N_{CS}$ value may be transmitted to the terminal as included in random access system information. Hereinafter, a case where a plurality of random access transmission attempts are performed in one PRACH period using the random access preambles generated using the above-described method will be described.

Figure 8:
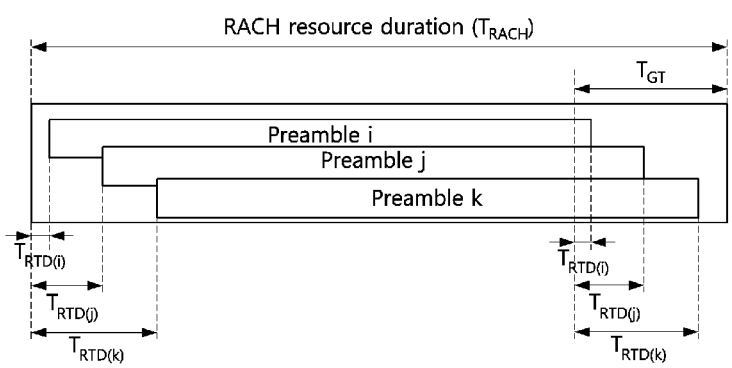
FIG. 8 is a conceptual diagram illustrating a plurality of random access transmissions according to an embodiment of the present disclosure.

FIG. 8 is a conceptual diagram illustrating a plurality of random access transmissions according to an embodiment of the present disclosure.

Referring to FIG. 8, the round trip delay (hereinafter, referred to as 'RTD') of each random access preamble (preambles # i, # j, or # k) received from each of three terminals $UE_i$, $UE_j$, and $UE_k$ within the transmission interval $T_{RACH}$ for random access preamble signals in a PRACH radio resource is illustrated.

$T_{GT}$ may denote the guard time considering $R_{TD}$, and $T_{RTD(i)}$, $T_{RTD(j)}$ and $T_{RTD(k)}$ may denote each $R_{TD}$ according to the distance between the base station and each terminal $UE_i$, $UE_j$, or $UE_k$. If the random access preambles (preambles # i, # j, and # k) transmitted from the three terminals use the cyclic shift offset $N_{CS}$ larger than the sum of the $T_{RTDCE}$ of the cell and the $T_{MDS}$ of the PRACH, the random access preambles (preambles # i, # j, and # k) transmitted from the three terminals may be detected without collision between the random access preambles at the base station due to the ideal cyclic auto-correlation property of the Zadoff-Chu sequences.

On the other hand, when there is a random access preamble having a redundant sequence among the random access preambles (preambles # i, # j, and # k) transmitted from three terminals, collision between the random access preambles may occur. Accordingly, the base station may not transmit a response on a success or a failure of the random access, irrespective of whether or not the occurrence of the collision between the random access preambles is detected. Therefore, the terminals waiting for the random access response may determine that the random access attempts are failed due to the collision of the preambles. As a result, since the terminal may not retransmit its random access preamble during a back-off time, which is a predetermined delay time until the preamble retransmission for the random access retry, so that the random access procedure may be delayed.

Meanwhile, a delay spread may occur due to a reception time delay phenomenon between a first received radio wave and a next received radio wave among radio waves received through different paths by a multipath characteristic of a radio channel. In case that two terminals $UE_a$ and $UE_b$ in an arbitrary cell environment synchronize their downlink frame timing and transmit their random access preambles configured in the same sequence on the uplink, a random access preamble round trip delay time $T_{RTD(a)}$ according to the distance between the base station and the terminal $UE_a$ and a random access preamble round trip delay time $T_{RTD(b)}$ according to the distance between the base station and the terminal $UE_b$ may be substantially similar. In such the case, power delay profiles (hereinafter, each referred to as 'PDP') distributions of the received random access preamble sequences may overlap with each other within an expected delay spread (hereinafter, referred to as 'EDS') range. In this case, the base station may not distinguish the cross-correlation between the received random access preambles, and the detection of the collision between the random access preambles transmitted by the terminals $UE_a$ and $UE_b$ may be impossible. Here, PDP may refer to a ratio of an average power distribution of the signal received through the multipath channel during an excess delay time from a transmission and reception reference time to a power during the reference time. Hereinafter, an occurrence of a situation in which collision detection between the random access preambles is not possible will be described.

Figure 9:
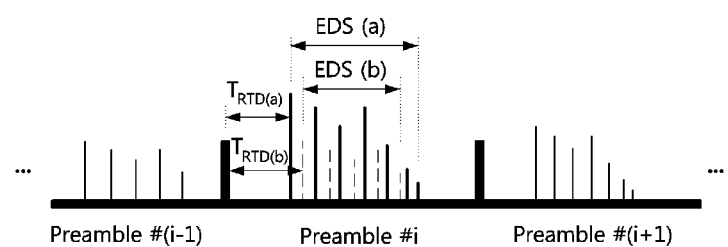
FIG. 9 is a conceptual diagram illustrating a plurality of random access transmissions according to another embodiment of the present disclosure.

FIG. 9 is a conceptual diagram illustrating a plurality of random access transmissions according to another embodiment of the present disclosure.

Referring to FIG. 9, there is illustrated a situation in which reception PDP distributions of the random access preamble i (e.g., preamble # i) to which the same Zadoff-Chu sequence is applied transmitted by the two different terminals $UE_a$ and $UE_b$ overlap each other and the collision between the random access preambles transmitted by two terminals is not detected. Specifically, when a primary collision due to the random access preambles occurs but the base station does not detect the collision, the base station may determine that the random access is successful by detecting the random access preamble sequence, and transmit a random access success response. At this time, the terminals having transmitted the random access preamble sequence composed of the same Zadoff-Chu sequence may determine that the random accesses of their own have been successful based on the received random access response, and may transmit uplink data through a resource allocated by uplink resource allocation information included in the random access response. As a result, a transmission failure of the uplink data corresponding to a secondary collision may occur, and a situation of a random access contention failure may occur.

Alternatively, when two different terminals (e.g., $UE_c$ and $UE_d$) in an arbitrary cell environment adjust their downlink frame timing, and transmit random access preambles composed of the same Zadoff-Chu sequence on each uplink, PDP distributions of the two random access preamble sequences received in the cell may be located outside the EDS range. In this case, if a preamble round trip delay time $T_{RTD(c)}$ according to the distance between the base station and the terminal UE, and a preamble round trip delay time $T_{RTD(d)}$ according to the distance between the base station and the terminal $UE_d$ are sufficiently spaced apart from each other without overlapping between the random access sequences, detection of the collision between the random access preambles may be possible. Hereinafter, a situation in which the above-described collision detection is possible will be described.

Figure 10:
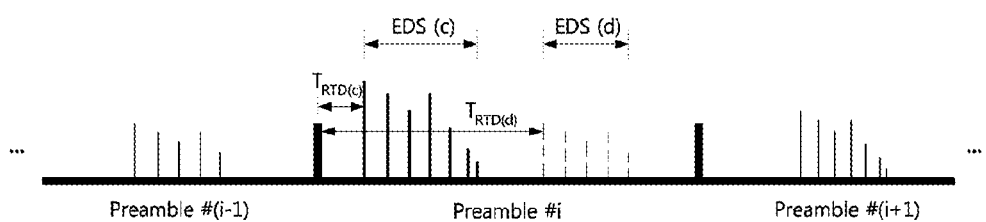
FIG. 10 is a conceptual diagram illustrating a plurality of random access transmissions according to yet another embodiment of the present disclosure.

FIG. 10 is a conceptual diagram illustrating a plurality of random access transmissions according to yet another embodiment of the present disclosure.

Referring to FIG. 10, there is illustrated a situation in which reception PDP distributions of the random access preamble i (e.g., preamble #1) to which the same Zadoff-Chu sequence is applied transmitted by the two different terminals $UE_c$ and $UE_d$ do not overlap each other and the collision between the random access preambles transmitted by two terminal is detected.

According to the situation of FIG. 10, when a primary collision occurs between the random access preambles and the base station detects such the collision, the base station may determine that the random access has failed through detection of the random access preamble sequence, and may not transmit a random access response indicating a success of the random access. Thus, the terminals may determine that the random access preamble transmission has failed after monitoring a random access response for a predetermined period of time. Therefore, the random access procedure may be delayed because the terminal does not retransmit its random access preamble during the back-off time which is the predetermined delay time until the retransmission of the random access preamble is attempted.

In comparison with the case of FIG. 10, in the situation as shown in FIG. 9, the primary collision between random access preambles and the secondary collision of the contention failure are caused, and thus the random access procedure may cause a transmission delay due to such the two types of random access failures. In order to reduce the probability of occurrence of the primary collision between random access preambles, in the mobile communication system, the number of subframe slots (a subframe consists of two slots) or the number of subframes through which the random access is possible may be increased in the time domain, or a multi-channel PRACH scheme may be used for increasing the random access opportunities by securing a larger number of radio resources for the random access channel in the frequency domain. Here, such the multi-channel PRACH scheme will be described.

Figure 11:
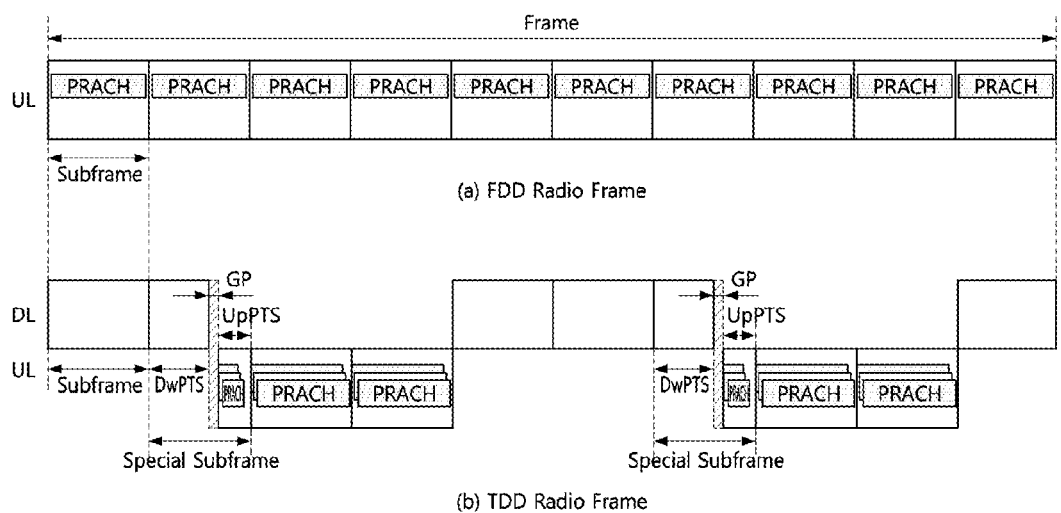
FIG. 11 is a conceptual diagram illustrating a multi-channel PRACH scheme according to an embodiment of the present disclosure.

FIG. 11 is a conceptual diagram illustrating a multi-channel PRACH scheme according to an embodiment of the present disclosure.

According to FIG. 11, there is illustrated an example of multi-channel application of RACH available in 3GPP LTE and LTE-A FDD/TDD systems. In the case of the FDD transmission mode, the random access preamble format may exist in each uplink subframe. In the TDD transmission mode, the random access preamble format may exist after a special subframe or in an uplink pilot time slot (UpPTS) to be described later. The special subframe existing in the TDD transmission mode may include an interval at which switching from downlink to uplink is taken, and may be composed of a downlink pilot time slot (DwPTS), a guard period (GP), and the UpPTS.

The mobile communication system operating in the FDD transmission mode may allocate a PRACH, which is a random access radio resource, to each uplink subframe by considering a load, a success probability, and an access delay time, etc. of the random access procedure in the cell, and the mobile communication system operating in the TDD transmission mode may allocate multiple PRACHs in a manner of allocating a plurality of PRACHs to one subframe in order to overcome the limitation of the random access opportunity due to the limitation of the number of uplink subframes. However, when a PRACH is assigned to each subframe or a plurality of PRACHs are used in one subframe, the mobile communication system needs more radio resources corresponding to the PRACHs used. That is, in the multi-channel PRACH operation for increasing the random access opportunity, a plurality of radio resources as many as the occupied radio channels are required. Also, an environment such as the IoT environment, where the number of terminals attempting to access the mobile communication system is increasing, requires random access resources, and a random access structure and a procedure for it are required. Hereinafter, a method for variably configuring multiple access slots in a PRACH according to a wireless channel environment according to an embodiment of the present disclosure will be described. First, various radio transceiving environments to be applied to the embodiment will be described.

Figure 12:
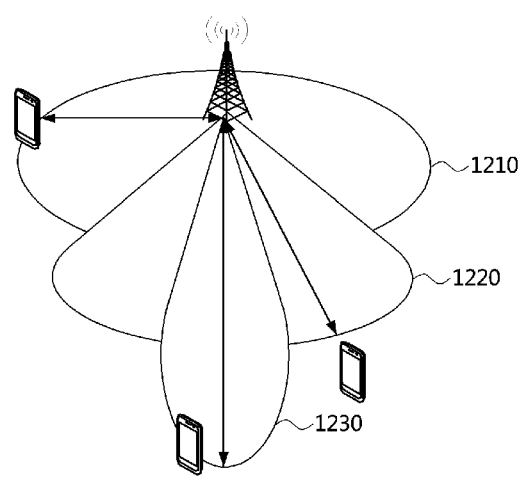
FIG. 12 is a conceptual diagram illustrating a radio transceiving environment according to an embodiment of the present disclosure.

FIG. 12 is a conceptual diagram illustrating a radio transceiving environment according to an embodiment of the present disclosure.

Referring to FIG. 12, according to a beam type of transmission and reception signals between a base station and a mobile station, first, there is a type of a radio transceiving environment transmitting and receiving an omni-directional beam using an omni-directional antenna in which an energy of a transmitted signal is radiated to the entire cell without distinguishing a specific direction, and a sector beam in which an energy of a transmitted signal is radiated only to a sector. Second, there is a type of a radio transceiving environment transmitting and receiving a spot beam 1230 or the like using a beamforming antenna in which an energy of a transmitted signal is intensively transmitted in a specific direction. Hereinafter, an embodiment of a random access to which multi-access slot PRACH configuration method according to the present disclosure is applied, which can be variably applied according to the above-described radio transceiving environments, will be described.

Figure 13:
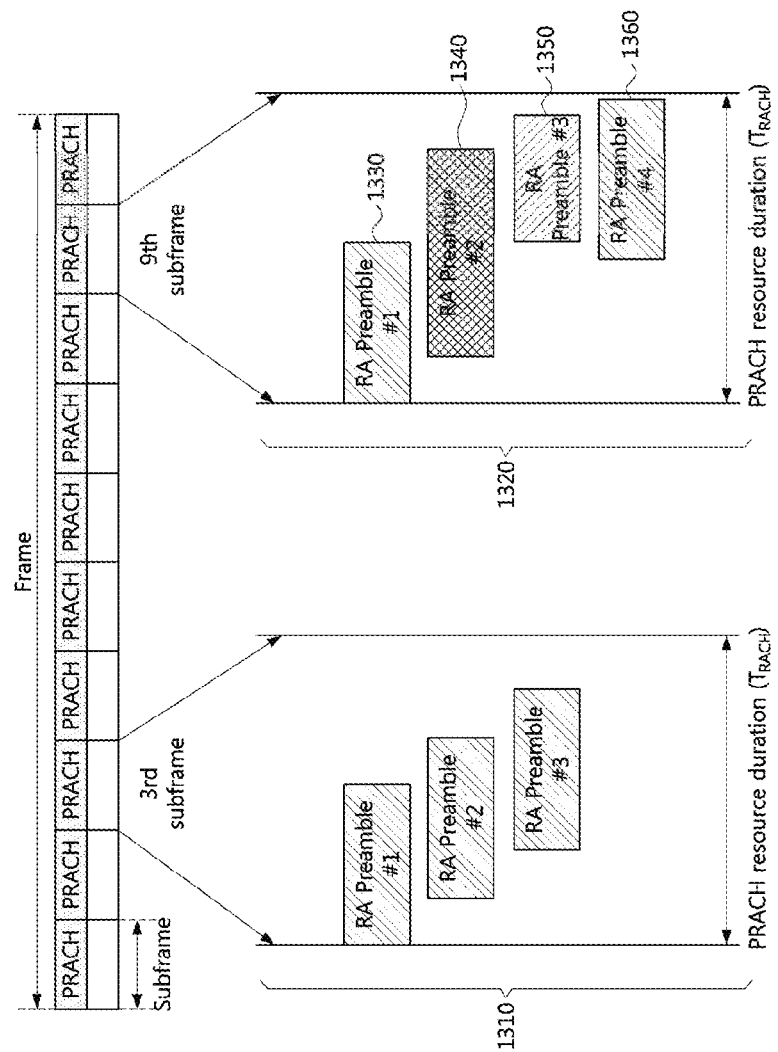
FIG. 13 is a conceptual diagram illustrating a method of configuring multiple access slots in a PRACH in a random access procedure according to an embodiment of the present disclosure.
Figure 14A:
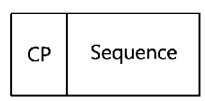
FIG. 14A is a conceptual diagram illustrating a random access preamble generation method 1 for a multi-access slot PRACH according to an embodiment of the present disclosure.
Figure 14B:
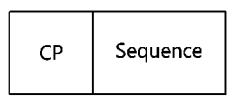
FIG. 14B is a conceptual diagram illustrating a random access preamble generation method 2 for a multi-access slot PRACH according to an embodiment of the present disclosure.
Figure 14C:
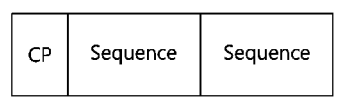
FIG. 14C is a conceptual diagram illustrating a random access preamble generation method 3 for a multi-access slot PRACH according to an embodiment of the present disclosure.
Figure 14D:
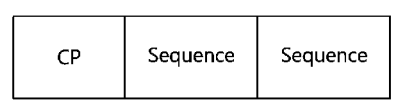
FIG. 14D is a conceptual diagram illustrating a random access preamble generation method 4 for a multi-access slot PRACH according to an embodiment of the present disclosure.

FIG. 13 is a conceptual diagram illustrating a method of configuring multiple access slots in a PRACH in a random access procedure according to an embodiment of the present disclosure.

Referring to FIG. 13, a plurality of subframes to which PRACHs are allocated are allocated to a frame. The embodiment of FIG. 13 illustrates a case where PRACHs are allocated to 10 subframes in the FDD transmission mode. However, the number of subframes to which the PRACHs are allocated may vary depending on an operation scheme of the mobile communication system. It may also be applied to the TDD transmission mode.

In the various radio channel environments, such as a cell area to which the omni-directional beam is applied, a cell area to which the sector beam is applied, or a cell area to which the spot beam is applied, multiple access slots may be multiplexed in a PRACH by allowing adjacent access slots to be overlapped with each other in the time domain. Thus, it is possible to increase the number of attempts of different random accesses within one PRACH without requiring additional radio resources despite the increase in the number of access slots. Also, the multiple access slots may be configured in such a manner that the same random access preamble format or different random access preamble formats are applied to respective access slots.

A total of three access slots are assigned to a PRACH 1310 allocated to a third subframe in FIG. 13, and the format of the random access preamble mapped to each access slot is configured identically. A total of four access slots are assigned to a PRACH 1320 allocated to a ninth subframe of FIG. 13, and the formats of the random access preambles included in the respective access slots are configured to be identical or different. That is, a first 1330 preamble and a fourth 1360 preamble have the same random access preamble format, and a second 1340 preamble and a third 1350 preamble have different formats from the other random access preambles. As described above, according to the multi-access slot PRACH configuration method according to the embodiment of the present disclosure, a plurality of PRACHs may be used, and a plurality of access slots to which the same or different random access preamble formats are applied may be allocated in each PRACH. Hereinafter, a method of generating a random access preamble for the multi-access slot PRACH according to the present disclosure will be described.

FIGS. 14A to 14D are conceptual diagrams each illustrating a random access preamble generation method 1 to 4 for a multi-access slot PRACH according to an embodiment of the present disclosure.

Referring to FIGS. 14A to 14D, according to a method of generating a random access preamble to be applied to each access slot as a method of configuring multiple access slots in the PRACH, a root Zadoff-Chu sequence and random access preamble sequences having the ideal cross-correlation property may be generated based on Equations 1 and 2, and different random access preambles may be generated through cyclic shifts of the random access preamble sequences. Here, a cyclic shift offset, which is a unit length of the cyclic shifts, may be set according to the size of the cell radius and may support different random access preamble formats. FIGS. 14A to 14D illustrate methods of generating a random access preamble to be applied to multiple access slots in the PRACH according to an embodiment of the present disclosure, and random access preambles to which different random access preamble formats are assigned may be mapped to the respective multiple access slots in the PRACH. Specific application of the different random access preamble formats to the access slots will be described later. The Zadoff-Chu sequence may be used as the random access preamble sequence according to the embodiment of the present disclosure, but not limited thereto, and all sequences including the characteristics of the Zadoff-Chu sequence may be used.

In FIGS. 14A to 14D, the length of the sequence may have a sequence length of $N_{ZC}$ that may be variably assigned. For example, the random access preamble format A shown in FIG. 14A may be composed of a Zadoff-Chu sequence part having a length $N_{ZC}$ and a CP part having a predetermined length. The random access preamble format B shown in FIG. 14B may be configured in a form having a longer CP than the CP of the format A by a predetermined length. The random access preamble format C shown in FIG. 14C may be configured in such a manner that the Zadoff-Chu sequence is repeated based on the format A and the $T_{SEQ}$ is doubled. The random access preamble format D shown in FIG. 14D may be configured such that the Zadoff-Chu sequence is repeated as in the format C to double the $T_{SEQ}$ and the CP is increased by a predetermined length. In addition to the configurations shown in FIGS. 14A to 14D, various types of random access preamble formats may be generated and configured according to the needs of the mobile communication system, and thus may be used for a random access preamble used in the multi-access slot PRACH. Hereinafter, a method of applying various random access preambles to the multi-access slot PRACH according to the present disclosure will be described.

First, the symbols used in the multi-access slot PRACH configuration method for allocating various random access preambles to the multi-access slot PRACH according to an embodiment of the present disclosure described below may be defined as follows. The symbols may be used to describe embodiments.

$T_{RACH}$: occupation length of PRACH radio resource (i.e., PRACH resource duration), which may be represented in the number of OFDM symbols or the number of samples n: The number of access slots for each PRACH channel i: access slot index, i=1, 2, ..., n $T_{SEQ}^{Slot\ \#\ i}$: occupation length of random access preamble sequence (i.e., preamble sequence duration) of the i-th access slot, which may be represented in the number of OFDM symbols or the number of samples $T_{CP}^{Slot\ \#\ i}$: occupation length of a cyclic prefix (CP) generated from the random access preamble sequence of the i-th access slot, which may be represented in the number of OFDM symbols or the number of samples $T_{RAP}^{Slot\ \#\ i}$: occupation length of a random access preamble of the i-th access slot, which may be represented as a sum of the preamble sequence duration and the CP occupation length of each access slot ($T_{RAP}^{Slot\ \#\ i} = T_{RAP}^{Slot\ \#\ i} + T_{SEQ}^{Slot\ \#\ i}$)

$T_{GT}^{Slot\ \#\ i}$: guard time of the i-th access slot, which may be represented in the number of OFDM symbols or the number of samples $T_{RAS\_duration}^{Slot\ \#\ i}$: occupation length of a random access slot of the i-th access slot, which may be represented as a sum of $T_{RAP}^{Slot\ \#\ i}$ and the length of guard time $N_{CS}$: cyclic shift offset value which is commonly applied in the radio transceiving environments using omni-directional beam or sector beam ($N_{CS}$ is configured based on Equation 3)

$N_{CS}^{Slot\ \#\ i}$: cyclic shift offset value of the i-th access slot in the radio transceiving environment in which a spot beam is transmitted and received using a beamforming antenna $T_{n_g}$: temporal length of guard samples, which may be represented in the number of OFDM symbols or the number of samples $T_{N_{CS}}$: time unit length of a cyclic shift offset value commonly applied in the radio transceiving environments using omni-directional beam or sector beam, which may be represented in the number of OFDM symbols or the number of samples $T_{RTDBE}^{Slot\ \#\ i}$: round trip delay time according to a distance between a receiving end and a transmitting end at a beam edge in the i-th access slot in which a spot bean is transmitted and received using a beamforming antaean, which may be represented in the number of OFDM symbols or the number of samples $T_{MDSBE}^{Slot\ \#\ i}$: maximum delay spread according to a distance between a receiving end and a transmitting end at a beam edge in the i-th access slot in which a spot bean is transmitted and received using a beamforming antaean and a channel property, which may be represented in the number of OFDM symbols or the number of samples $T_{N_{CS}}^{Slot\ \#\ i}$: time unit length of cyclic shift offset $N_{CS}^{Slot\ \#\ i}$ of the i-th access slot in the radio transceiving environment in which a spot beam is transmitted and received using a beamforming antenna, which may be represented in the number of OFDM symbols or the number of samples $T_{StartOfSlot}^{Slot\ \#\ i}$: starting position of the i-th access slot (the starting position of the first access slot among multiple access slots is the same as the starting position of the random access channel) (i.e., $T_{StartOfSlot}^{Slot\ \#\ i}=0$, if i=1)

$T_{EndOfSlot}^{Slot\ \#\ i}$: ending position of the i-th access slot (i.e., $T_{EndOfSlot}^{Slot\ \#\ i} = T_{StartOfSlot}^{Slot\ \#\ i} + T_{RAS\_duration}^{Slot\ \#\ i}$)

$T_{StartOffset}^{Slot\ \#\ i}$: offset between the starting position of the (i-1)-th access slot and the starting position of the i-th access slot By using the above symbols, the multi-access slot configuration of the physical layer random access channel (PRACH) according to the embodiment of the present disclosure may be implemented as follows.

In a first configuration method, it is possible to configure $T_{RAP}^{Slot\ \#\ i}$ and $T_{GT}^{Slot\ \#\ i}$ to be the same as or different from each other based on a cell edge, a beam edge, or a random access preamble format. Therefore, the occupation lengths ($T_{RAS\_duration}^{Slot\ \#\ i}$) of the corresponding access slots may be the same or different. This is because the occupation length of the i-th access slot may be expressed as a sum of the occupation length of the random access preamble of the access slot and the guard time of the access slot, as shown in Equation 4 for calculating $T_{RAS\_duration}^{Slot\ \#\ i}$.

$$T_{RAS\_duration}^{Slot\ \#\ i} = T_{RAP}^{Slot\ \#\ i} + T_{GT}^{Slot\ \#\ i} \quad \text{[Equation 4]}$$

In a second configuration method, the starting position ($T_{StartOfSlot}^{Slot\ \#\ i}$) of each access slot subsequent to the first access slot may be arranged using a sum of its own offset and offsets ($T_{StartOffset}^{Slot\ \#\ i}$) of previously-located access slots, as shown in Equation 5 (except the first access slot).

$$T_{StartOfSlot}^{Slot\#i} = \sum_{k=2}^{i} T_{StartOfOffset}^{Slot\#k}, \quad 2 \leq i \leq n \quad \text{[Equation 5]}$$

For example, as shown by 1610 of FIG. 16, $T_{StartOfSlot}^{Slot\ \#3}$ that is the starting position of the third access slot in FIG. 16, which will be described later, is equal to a sum of the offset of the third access slot itself and the offsets ($T_{StartOffset}^{Slot\ \#\ i}$) of the access slots excluding the first access slot. That is, $T_{StartOfSlot}^{Slot\ \#3} = T_{StartOffset}^{Slot\ \#3} + T_{StartOffset}^{Slot\ \#2}$.

In a third configuration method, the ending position ($T_{EndOfSlot}^{Slot\ \#\ i}$) of each access slot may be arranged later than the ending position ($T_{EndOfSlot}^{Slot\ \#(i-1)}$) of the previous access slot as shown in Equation 6 (i.e., means being arranged to occur later in time).

$$T_{EndOfSlot}^{Slot\ \#1} < T_{EndOfSlot}^{Slot\ \#2} < \ldots < T_{EndOfSlot}^{Slot\ \#3} \quad \text{[Equation 6]}$$

For example, the ending position $T_{EndOfSlot}^{Slot\ \#3}$ 1620 of the third access slot in FIG. 16, which will be described later, may be arranged later than $T_{EndOfSlot}^{Slot\ \#2}$ and $T_{EndOfSlot}^{Slot\ \#1}$ in time.

In a fourth configuration method, a configuration method for avoiding collision due to superposition of consecutively placed access slots may be provided. Through this, a collision between random access preamble sequences of neighboring access slots resulting from overlapping with previous access slots may be avoided.

Specifically, a sum of the starting position ($T_{StartOfSlot}^{Slot\ \#\ i}$) of each access slot and the random access preamble occupation length ($T_{RAP}^{Slot\ \#\ i}$) of the corresponding access slot may be configured to be larger than the ending position ($T_{EndOfSlot}^{Slot\ \#(i-1)}$) of the previous access slot as shown in Equation 7.

$$T_{StartOfSlot}^{Slot\ \#\ i} + T_{RAP}^{Slot\ \#\ i} > T_{EndOfSlot}^{Slot\ \#(i-1)}, \quad 2 \leq i \leq n \quad \text{[Equation 7]}$$

For example, the ending position $T_{EndOfSlot}^{Slot\ \#1}$ 1630 of the first access slot shown in FIG. 16, which will be described later, may be arranged earlier than a sum of the starting position of the second access slot indicated by 1640 of FIG. 16 and the random access preamble occupation length of the second access slot.

In the case where the terminal performs the random access to the base station by applying the above-described multi-access slot PRACH configuration method, the terminal may acquire downlink synchronization, select an i-th access slot in a random access channel obtained using system information received from the base station, and transmit a rand access preamble based on the starting position ($T_{StartOfSlot}^{Slot\ \#\ i}$) of the corresponding access slot. Thereafter, the base station may perform random access preamble detection for each access slot within a period derived from the starting position ($T_{StartOfSlot}^{Slot\ \#\ i}$) of each access slot and the occupation length ($T_{RAS\_duration}^{Slot\ \#\ i}$) of each access slot within the random access channel occupation time $T_{RACH}$. As described above, the Zadoff-Chu sequence is used as the random access preamble sequence according to the embodiment of the present disclosure, but not limited thereto, and all the sequences having the property of the Zadoff-Chu sequence may be used.

Hereinafter, a specific method of multi-access slot assignment to the PRACH according to the present disclosure and a random access procedure to which the PRACH multi-access slot configuration method is applied will be described.

Figure 15:
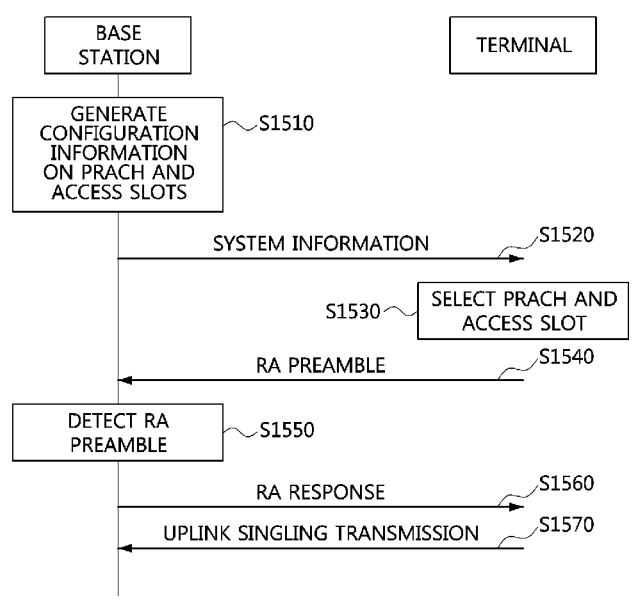
FIG. 15 is a sequence chart illustrating a random access procedure to which a PRACH multi-access slot configuration method according to an embodiment of the present disclosure is applied.

FIG. 15 is a sequence chart illustrating a random access procedure to which a PRACH multi-access slot configuration method according to an embodiment of the present disclosure is applied.

Referring to FIG. 15, there is illustrated a contention-based random access procedure in which a terminal transmits a random access preamble and a base station detects a random access preamble sequence by applying the multi-access slot PRACH configuration method according to an embodiment of the present disclosure. The random access procedure may be generally classified into a contention-based random access procedure and a non-contention-based random access procedure. The classification between the contention-based random access procedure and the non-contention-based random access procedure may be determined depending on whether the terminal directly selects a random access preamble used in the random access procedure or whether the base station selects the random access preamble. In the non-contention-based random access procedure, the terminal uses a random access preamble that the base station directly assigns to itself. Therefore, when the base station allocates a specific random access preamble only to the terminal, the random access preamble is used only by the terminal, and other terminals do not use the random access preamble. Thus, the non-contention-based random access procedure is a random access procedure without collision. In the contention-based random access procedure, there is a possibility that a plurality of terminals use the same random access preamble because they arbitrarily select and transmit random access preambles commonly usable by the terminals. Therefore, even if the base station receives a specific random access preamble, the base station cannot know which terminal transmitted the random access preamble.

According to the embodiment of FIG. 15, the base station may generate and configure system information including configuration information on a PRACH composed of a plurality of access slots to be provided to a terminal that is going to access the base station, in the manner supported by the mobile communication system (S1510). Then, the terminal desiring to attempt a random access may receive the system information including the configuration information on PRACH composed of a plurality of access slots from the base station (S1520).

Figure 18:
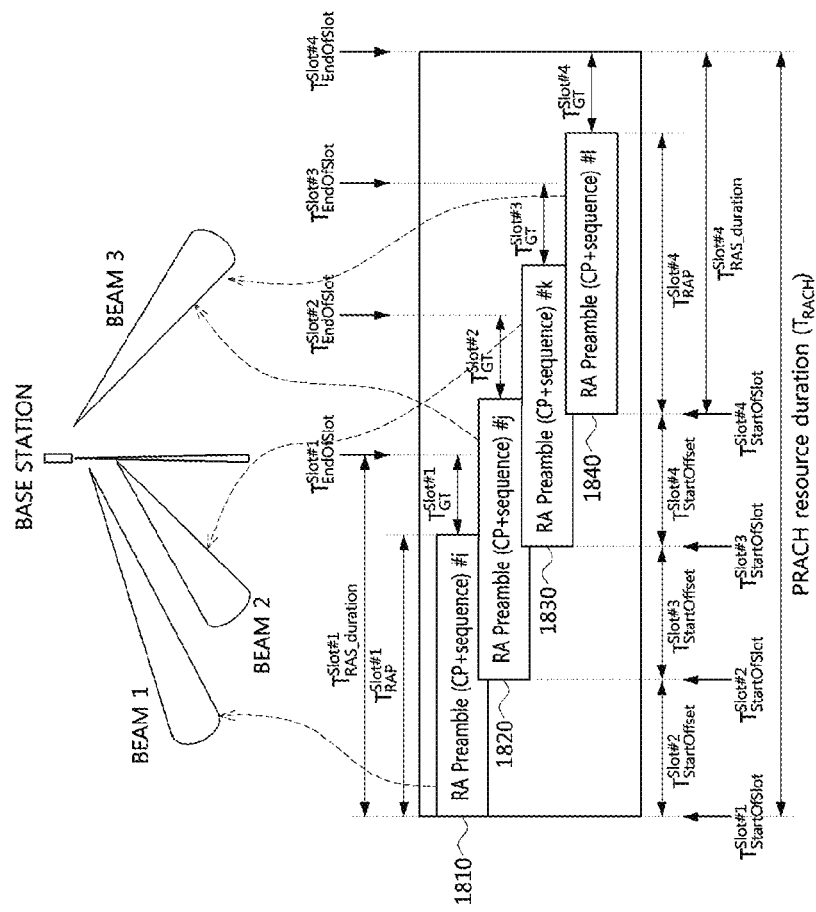
FIG. 18 is a conceptual diagram illustrating a method of applying multiple access slots to a multi-beam base station environment according to an embodiment of the present disclosure.
Figure 19:
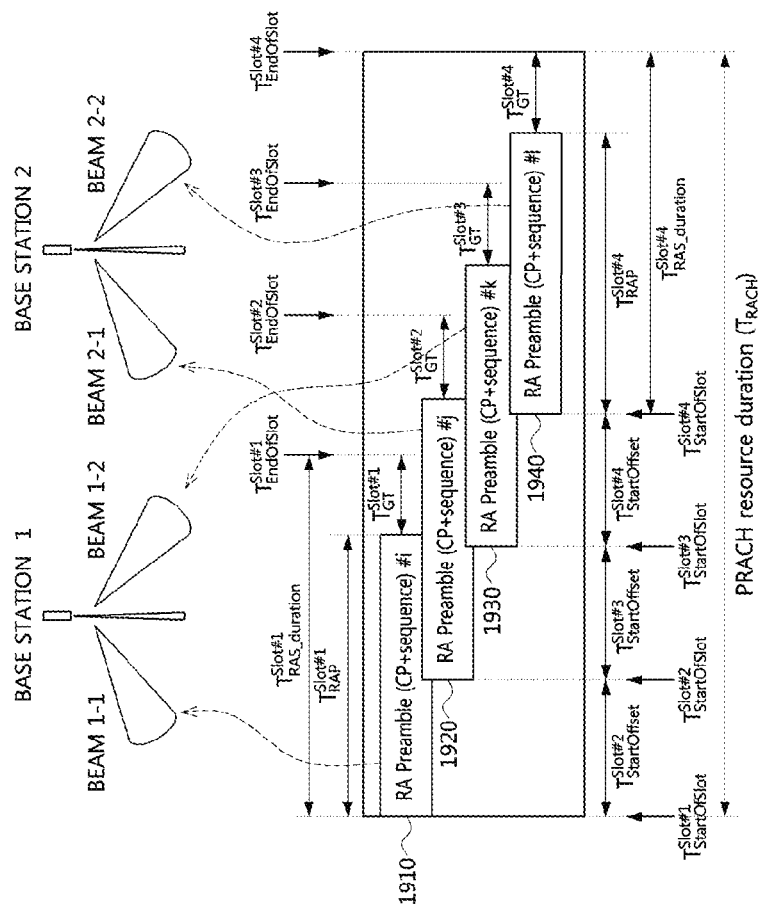
FIG. 19 is a conceptual diagram illustrating a method of applying multiple access slots to a multi-beam base station environment according to another embodiment of the present disclosure.

In this case, in a radio channel environment transmitting and receiving an omni-directional beam using an omni-directional antenna in which the energy of the transmitted signal is radiated to the entire cell without distinguishing a specific direction or a sector beam in which the energy of the transmitted signal is radiated to only in some sectors, the base station may determine the round trip time delay (RTD) and the delay spread (DS) according to the channel environment and the cell radius, and may generate and configure configuration information on PRACH composed of a plurality of access slots. The base station may transmit, to the terminal within the cell, system information including the configuration information on the PRACH composed of the plurality of access slots through the omni-directional beam, the sector beam, and/or the spot beam. Specifically, as shown in the embodiments of FIGS. 18 and 19 to be described later, the base station may transmit system information including configuration information on a PRACH allocated for each beam of the base station to the terminal for each omni-directional beam and/or each sector beam. The terminal may acquire information on the PRACH and the access slot supported by the specific beam through the configuration information on the PRACH allocated for each beam, and when attempting a random access in a specific beam region, the terminal may transmit a random access preamble through the PRACH and the access slot allowed in the specific beam region. The configuration information on the PRACH used for each beam may be determined in advance to minimize inter-access slot interference in the mobile communication system, and may vary depending on the operation environment.

The configuration information on the PRACH may include the following and may add and/or modify necessary information to suit the operation environment of the communication system.

Information on the number (n) of access slots per PRACH

Information on radio resource occupation length ($T_{RACH}$) of PRACH

Information on random access preamble format that can be transmitted and received in each access slot (information for determining $T_{RAP}^{\#\ i}$, $T_{SEQ}^{\#\ i}$, $T_{DP}^{Slot\ \#\ i}$, $T_{GT}^{Slot\ \#\ i}$, $T_{RAS\_duration}^{Slot\ \#\ i}$, etc.)

A root sequence number, a cyclic shift offset value, and a time unit length information used for generate random access preamble sequences having ideal cross-correlation properties Information on a start offset of access slot, information on a starting position and an ending position of access slot ($T_{StartOffset}^{Slot\ \#\ i}$, $T_{StartOfSlot}^{Slot\ \#\ i}$, $T_{EndOfSlot}^{Slot\ \#\ i}$)

Also, for a case where the mobile communication system supports random access using the same time and frequency region between adjacent base stations as in a CoMP environment to be described later, configuration information on a PRACH for each omni-directional beam or sector beam associated with the adjacent base station may also be included in the system information.

A specific method of configuring the multi-access slot PRACH in the radio transceiving environment using an omni-directional beam or sector beam will be described. This may be applied to a case where an access slot can be arbitrarily selected without discrimination by the terminal attempting a random access through the multi-access slots constituting the PRACH channel in common for the entire cell area or the sector area.

First, in order to overcome the interference effect between the random access preamble sequences due to the difference of the round trip delay time ($T_{RTDCE}$) related to the radio wave arrival distance, as shown in Equation 8, the guard time $T_{GT}^{Slot \, \# \, i}$ may be configured to be equal to or larger than the round trip delay time at cell edge ($T_{RTDCE}$).

$$T_{GT}^{Slot \, \# \, i} \geq T_{RTDCE}, i=1,2,\ldots,n \quad \text{[Equation 8]}$$

At this time, if the guard time ($T_{GT}^{Slot \, \# \, i}$) of each access slot and the round trip delay time at cell edge ($T_{RTDCE}$) are equal to each other, the guard time of all access slots may be configured identically.

Also, as represented in Equation 9, the cyclic shift offset value $N_{CS}$ in sample units of the random access preamble sequence applied to each access slot may be limited to be equal to or greater than the sum of the round trip delay time at cell edge ($T_{RTDCE}$) and the maximum delay spread time ($T_{MDS}$).

$$N_{CS} \geq \left[ (T_{RTDCE} + T_{MDS}) \times \frac{N_{ZC}}{T_{SEQ}} \right] + n_S \quad \text{[Equation 9]}$$

Also, the time unit length $T_{N_{CS}}$ of the cyclic shift offset $N_{CS}$ may have a limitation as shown in Equation 10. That is, $T_{N_{CS}}$ may be limited to be equal to or greater than the sum of the round trip delay time at cell edge ($T_{RTDCE}$), the maximum delay spread time ($T_{MDS}$), and the time unit length of guard samples ($T_{n_g}$).

$$T_{N_{CS}} \geq T_{RTDCE} + T_{MDS} + T_{n_g} \quad \text{[Equation 10]}$$

Also, as represented in Equation 11, the start offset $T_{StartOffset}^{Slot \, \# \, i}$ of each access slot may be configured to be equal to or greater than the guard time $T_{GT}^{Slot \, \#(i-1)}$ of the previous access slot.

$$T_{StartOffset}^{Slot \, \# \, i} \geq T_{GT}^{Slot \, \#(i-1)}, 2 \leq i \leq n \quad \text{[Equation 11]}$$

Separately, the start offset $T_{StartOffset}^{Slot \, \# \, i}$ of each access slot may be defined using the property of the Zadoff-Chu sequence. That is, it is possible to use the property of the cyclic shifted Zadoff-Chu sequence and the property in which the interferences between random access attempts of adjacent access slots using random access preambles derived from the same root Zadoff-Chu sequence can be eliminated. Specifically, the ideal cyclic auto-correlation property of the Zadoff-Chu sequence resulting from the round trip delay or delay spread of the received Zadoff-Chu sequence in the access slot at the receiving end, and the ideal zero cross-correlation property between random access preambles to which different Zadoff-Chu sequences are applied may be used.

With these properties, the start offset ($T_{StartOffset}^{Slot \, \# \, i}$) of each access slot may be defined as shown in Equation 12. That is, to improve the random access performance of each access slot, the start offset $T_{StartOffset}^{Slot \, \# \, i}$ of the access slot may be limited to be equal to or greater than the sum of the round trip delay time at cell edge ($T_{RTDCE}$) and the maximum delay spread time ($T_{MDS}$) which is calculated from Equation 10. Specifically, the length of the start offset $T_{StartOffset}^{Slot \, \# \, i}$ of each access slot may be configured to be equal to or greater than the time unit length $T_{N_{CS}}$ of the cyclic shift offset $N_{CS}$ limiting the length of the start offset $T_{StartOffset}^{Slot \, \# \, i}$ to be greater than a sample unit representation of the sum of the round trip delay time at cell edge ($T_{RTDCE}$) and the maximum delay spread time ($T_{MDS}$).

$$T_{StartOffset}^{Slot \, \#1} \geq T_{N_{CS}}, w \leq i \leq n \quad \text{[Equation 12]}$$

Then, the terminal having received the system information by acquiring the frame synchronization through a downlink synchronization signal received from the base station may obtain the configuration on the PRACH composed of the plurality of access slots, and select a PRACH and an access slot (or, access slot index) (S1530).

The terminal may select a random access preamble sequence available based on the cyclic shift offset $N_{CS}$ included in the configuration information, and transmit a random access preamble based on the selected random access preamble sequence to the base station at the starting position (derivable from $T_{StartOfSlot}^{Slot \, \# \, i}$) of the selected access slot (S1540).

Then, for all access slots for each omni-directional beam or sector beam, the base station may determine which random access preamble sequence is received by referring the available random access preamble sequences within from the starting position $T_{StartOfSlot}^{Slot \, \# \, i}$ of each access slot to the ending position $T_{EndOfSlot}^{Slot \, \# \, i}$ of the corresponding access slot (S1550). If the base station successfully detects the random access preamble sequence in each access slot, the base station may estimate the transmission timing of the terminal for each random access preamble index and derive the random access preamble sequence which has been successfully detected for each access slot in the corresponding PRACH. Also, the base station may transmit to the terminal a random access response (i.e., 'RAR') including uplink timing adjustment information (i.e., timing advanced (TA)) derived from the derived random access preamble sequence (S1560).

The terminal may transmit uplink resource request data, which is signaling information, to the base station through a predetermined uplink control channel after adjusting its uplink timing by referring to the received RAR (S1570). Hereinafter, a random access procedure to which a multi-access slot PRACH configuration method according to an embodiment of the present disclosure in a wireless channel environment transmitting a spot beam is applied will be described.

The random access procedure to which the multi-access slot PRACH configuration method in the radio channel environment in which the spot beam is transmitted is applied may follow a similar method to the embodiment shown in FIG. 15 described above. First, the base station may generate and configure system information including configuration information on a PRACH including a plurality of access slots to be provided to a terminal that is to access the base station (S1510). Then, the terminal attempting to perform a random access may receive the system information including configuration information on the PRACH from the base station (S1520). The system information may also include configuration information on PRACH available for each spot beam. Also, for the case where the mobile communication system supports random accesses using the same time and frequency resources between neighbor base stations as in the CoMP environment to be described later, the configuration information on the PRACH for each spot beam associated with the neighbor base stations may be included in the system information. Specifically, as shown in the embodiments of FIG. 18 and FIG. 19, the base station may transmit system information including the configuration information on PRACH to the terminal for each omni-directional beam, sector beam, and/or spot beam. The terminal may acquire information on PRACH and access slots supported by a specific beam through the configuration information on the PRACH for each spot beam, and when the random access is attempted in a region for the specific beam, the terminal may transmit a random access preamble through the PRCH and access slot supported by the region of the specific beam. The configuration information on the PRACH for each beam may be determined in advance by the mobile communication system so as to minimize interferences between the access slots, and may vary according to the operation environments.

In this case, in the radio transceiving environment in which a spot beam or the like is transmitted or received using a beamforming antenna in which the energy of the transmitted signal is intensively transmitted in a specific direction, the base station may determine the round trip delay time RTD and the delay spread time DS according to the radio wave arrival distance and channel environment for each beam. Then, it is possible to generate and configure information described below in order to configure the per-beam PRACH and multiple access slots, and the terminal in the corresponding beam region may receive the configuration information on the PRACH composed of the plurality of access slots from the base station. The received information may be as follows, and information necessary for the operation environment of the mobile communication system may be added and/or modified.

Information on the number (n) of access slots per PRACH

Information on radio resource occupation length ($T_{RACH}$) of PRACH

Information on random access preamble format that can be transmitted and received in each access slot (information for determining $T_{RAP}^{Slot\ \#\ i}$, $T_{SEQ}^{Slot\ \#\ i}$, $T_{CP}^{Slot\ \#\ i}$, $T_{GT}^{Slot\ \#\ i}$, $T_{RAS\_duration}^{Slot\ \#\ i}$, etc.)

A root sequence number for generating random access preamble sequences having ideal cross-correlation property, and information on a cyclic shift offset value ($N_{CS}^{Slot\ \#\ i}$) and time unit length information ($T_{N_{CS}}^{Slot\ \#\ i}$) which may be applied commonly to all the access slots or applied differently to the respective access slots.

Information on a start offset of access slot, information on a starting position and an ending position of access slot ($T_{StartOffset}^{Slot\ \#\ i}$, $T_{StartOffset}^{Slot\ \#\ i}$, $T_{EndOfSlot}^{Slot\ \#\ i}$)

Hereinafter, an embodiment of a multi-access slot PRACH configuration method in the radio transceiving environment in which a spot beam is transmitted using a beamforming antenna and the energy of the transmitted signal is transferred in a specific direction will be described. That is, it is possible for a terminal attempting a random access in each beam region may arbitrarily select an access slot. Alternatively, the terminal may select an access slot by considering a maximum propagation distance at a beam edge, or may select an access slot by considering cooperation between adjacent beams. A multi-access slot PRACH configuration method that may be utilized in such the various cases will be described.

The guard time $T_{GT}^{Slot\ \#\ i}$ of each access slot in case of the spot beam may be configured to be equal to or larger than the round trip delay time at beam edge $T_{RTDBE}^{Slot\ \#\ i}$, as shown in Equation 13. This is to differentiate the guard times of the access slots for each beam so that the round trip delay time $T_{RTDBE}^{Slot\ \#\ i}$ due to differences in propagation distances of the random access preambles transmitted by the terminals located at various positions in the beam region are changed. Thus, it is possible to overcome the interference influence of the random access preamble sequences by using the characteristics that the round trip delay times are changed.

$$T_{GT}^{Slot\ \#\ i} \geq T_{RTDBE}^{Slot\ \#\ i}, i=1,2,\ldots,n \qquad \text{[Equation 13]}$$

In this case, if the guard time $T_{GT}^{Slot\ \#\ i}$ of all the access slots and the round trip delay time $T_{RTDBE}^{Slot\ \#\ i}$ at the beam edge are equal to each other, the guard time of all the access slots may be configured identically.

Next, the cyclic shift offset value $N_{CS}^{Slot\ \#\ i}$ of the sample unit random access preamble sequence applied to each access slot with respect to the beam edge may be determined based on Equation 14. That is, $N_{CS}^{Slot\ \#\ i}$ may be set to a value equal to or greater than the sum of the round trip delay time at beam edge $T_{RTDBE}^{Slot\ \#\ i}$ and the maximum delay spread time $T_{MDSBE}^{Slot\ \#\ i}$.

$$N_{CS}^{Slot\#i} \geq \left\lceil (T_{RTDBE}^{Slot\#i} + T_{MDSBE}^{Slot\#i}) \times \frac{N_{ZC}}{T_{SEQ}^{Slot\#i}} \right\rceil + n_g \qquad \text{[Equation 14]}$$

The time unit length $T_{N_{CS}}^{Slot\ \#\ i}$ of the cyclic shift offset $N_{CS}^{Slot\ \#\ i}$ of the i-th access slot may be limited to be equal to or greater than the sum of the round trip delay time at beam edge $T_{RTDBE}^{Slot\ \#\ i}$, the maximum delay spreading time at beam edge $T_{MDSBE}^{Slot\ \#\ i}$, and the sample unit length of the guard samples $T_{n_g}$.

$$T_{N_{CS}}^{Slot\ \#\ i} \geq T_{RTDBE}^{Slot\ \#\ i} + T_{MDSBE}^{Slot\ \#\ i} T_{n_g} \qquad \text{[Equation 15]}$$

Next, the start offset $T_{StartOffset}^{Slot\ \#\ i}$ of each access slot may be equal to or greater than the guard time of the previous access slot $T_{GT}^{Slot\ \#\ i-1}$ as shown in Equation 16.

$$T_{StartOffset}^{Slot\ \#\ i} \geq T_{GT}^{Slot\ \#\ i-1}, i=1,2,\ldots,n \qquad \text{[Equation 16]}$$

Separately, the start offset $T_{StartOffset}^{Slot\ \#\ i}$ of each access slot may be defined using the properties of the Zadoff-Chu sequence. That is, when using the random access preambles derived from the same root Zadoff-Chu sequence in the adjacent slots with the property of the circulated Zadoff-Chu sequence, it is possible to eliminate interference between the random access attempts using the random access preambles. Specifically, it is possible to use the ideal cyclic auto-correlation property of the Zadoff-Chu sequence caused by the round trip delay and the delay spread of the Zadoff-Chu sequence received within the slot and the ideal zero cross-correlation property between the random access preambles to which different Zadoff-Chu sequences are applied.

With these properties, the start offset $T_{StartOffset}^{Slot\ \#\ i}$ of each access slot may be defined as shown in Equation 12. That is, even when more radio resources of the PRACH are occupied in the time domain in order to improve the random access performance of each access slot, the start offset $T_{StartOffset}^{Slot\ \#\ i}$ of the access slot may be configured to be equal to or greater than the sum of the round trip delay time at beam edge $T_{RTDBE}^{Slot\ \#\ i}$, the maximum delay spread time at beam edge $T_{MDSBE}^{Slot\ \#\ i}$, and the sample unit length of the guard samples $T_{n_g}$, or configured to be equal to or greater than the sum of the round trip delay time at beam edge $T_{RTDBE}^{Slot\ \#\ i}$ and the maximum delay spreading time at beam edge $T_{MDSBE}^{Slot\ \#\ i}$.

Specifically, the length of the start offset $T_{StartOffset}^{Slot\ \#\ i}$ of each access slot may be configured to be equal to or greater than the time unit length $T_{N_{CS}}^{Slot\ \#\ i}$ of the cyclic shift offset $N_{CS}^{Slot\ \#\ i}$ for limiting the length of the start offset $T_{StartOffset}^{Slot\ \#\ i}$ to be larger than the sample unit representation of the sum of the round trip delay time at beam edge $T_{RTDBE}^{Slot\ \#\ i}$, the maximum delay spread time at beam edge $T_{MDSBE}^{Slot\ \#\ i}$, and the sample unit length of the guard samples $T_{n_g}$.

$$T_{StartOffset}^{Slot\ \#\ i} \geq T_{N_{CS}}^{Slot\ \#\ i}, i=1,2,\ldots,n \quad \text{[Equation 17]}$$

Then, the terminal having acquired frame synchronization through the downlink synchronization signal and system information received from the terminal and having received the configuration information on the PRACH and multiple access slots may select a PRACH and an access slot (or, access slot index) (S1530). Then, the terminal may select an available random access preamble sequence by referring to the cyclic shift offset $N_{CS}^{Slot\ \#\ i}$, and transmit a random access preamble to the base station based on the starting position $T_{StartOfSlot}^{Slot\ \#\ i}$ of the selected access slot (S1540).

Then, for all access slots for the PRACH for each beam, the base station may determine which random access preamble sequence is received by referring the available random access preamble sequences within from the starting position $T_{StartOfSlot}^{Slot\ \#\ i}$ of each access slot to the ending position $T_{EndOfSlot}^{Slot\ \#\ i}$ of the corresponding access slot (S1550). If the base station successfully detects the random access preamble sequence in each access slot, the base station may estimate the transmission timing of the terminal for each random access preamble index. Then, the base station may transmit, to the terminal, a random access response (i.e., 'RAR') including uplink timing adjustment information (i.e., timing advanced (TA)) needed for uplink synchronization, which was derived from the random access preamble sequence which has been successfully detected in the access slot of the corresponding PRACH (S1560).

The terminal may transmit uplink resource request data, which is signaling information, to the base station through a predetermined uplink control channel after adjusting its uplink timing by referring to the received RAR (S1570). Hereinafter, a multi-access slot configuration method in various radio environments according to an embodiment of the present disclosure will be described.

Figure 16:
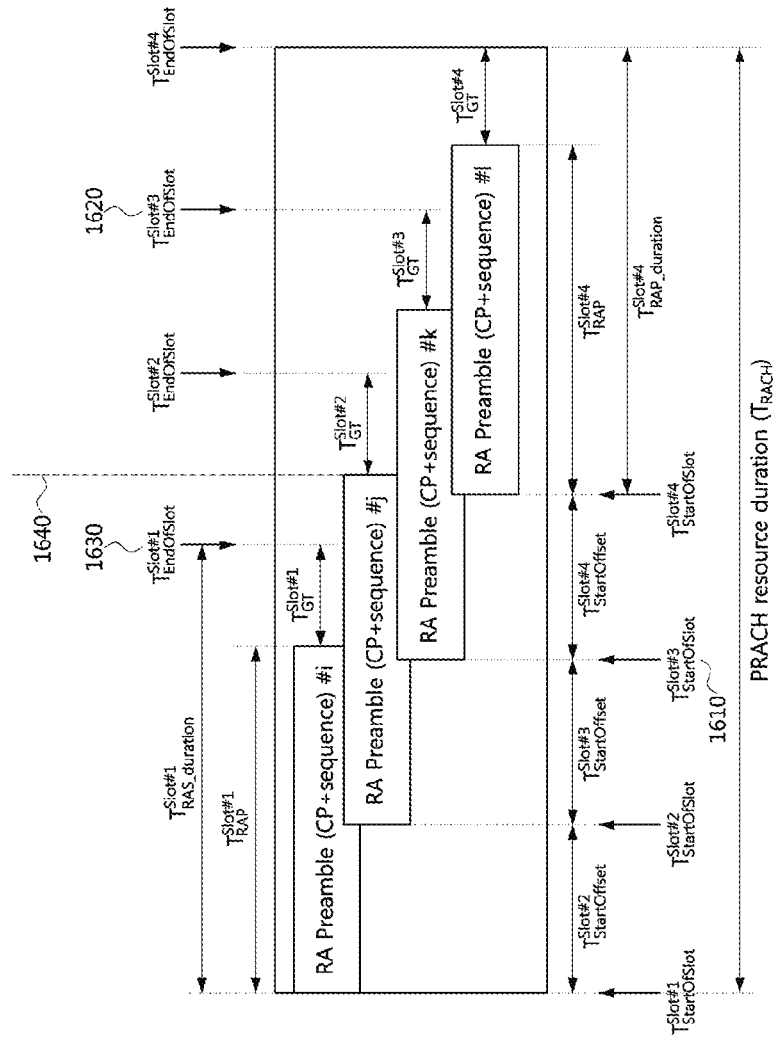
FIG. 16 is a conceptual diagram illustrating a method of applying multiple access slots to various radio channel environments according to an embodiment of the present disclosure.

FIG. 16 is a conceptual diagram illustrating a method of applying multiple access slots to various radio channel environments according to an embodiment of the present disclosure.

Referring to FIG. 16, illustrated is an embodiment in which four access slots (n=4) are configured in an arbitrary PRACH in the FDD transmission mode and the same random access preamble format is applied to the respective access slots. The multi-access slot PRACH configuration method in the FDD transmission mode of FIG. 16 may be also applicable to the TDD transmission mode. Also, the number of access slots and the random access preamble format of the respective access slots may be variably changed according to the system scheme.

The terminal desiring to transmit a random access preamble to the base station may transmit the random access preamble based on the starting position $T_{StartOfSlot}^{Slot\ \#\ i}$ of the access slot selected for transmitting the random access preamble. The base station may perform detection of random access preambles during the PRACH occupation time $T_{RACH}$ by identifying positions of random access preambles for the respective access slots based on the starting positions $T_{StartOfSlot}^{Slot\ \#\ i}$ and the occupation length $T_{RAS_{duration}}^{Slot\ \#\ i}$ of the respective access slots.

The present embodiment is for a case in which four access slots are arranged in a single PRACH as having different start offsets $T_{StartOffset}^{Slot\ \#\ i}$. For each access slot, a random access preamble may be allocated. The base station may identify a terminal attempting random access by detecting the random access preamble allocated to each access slot. Hereinafter, a case where the random access preamble format is changed and applied to each access slot will be described.

Figure 17:
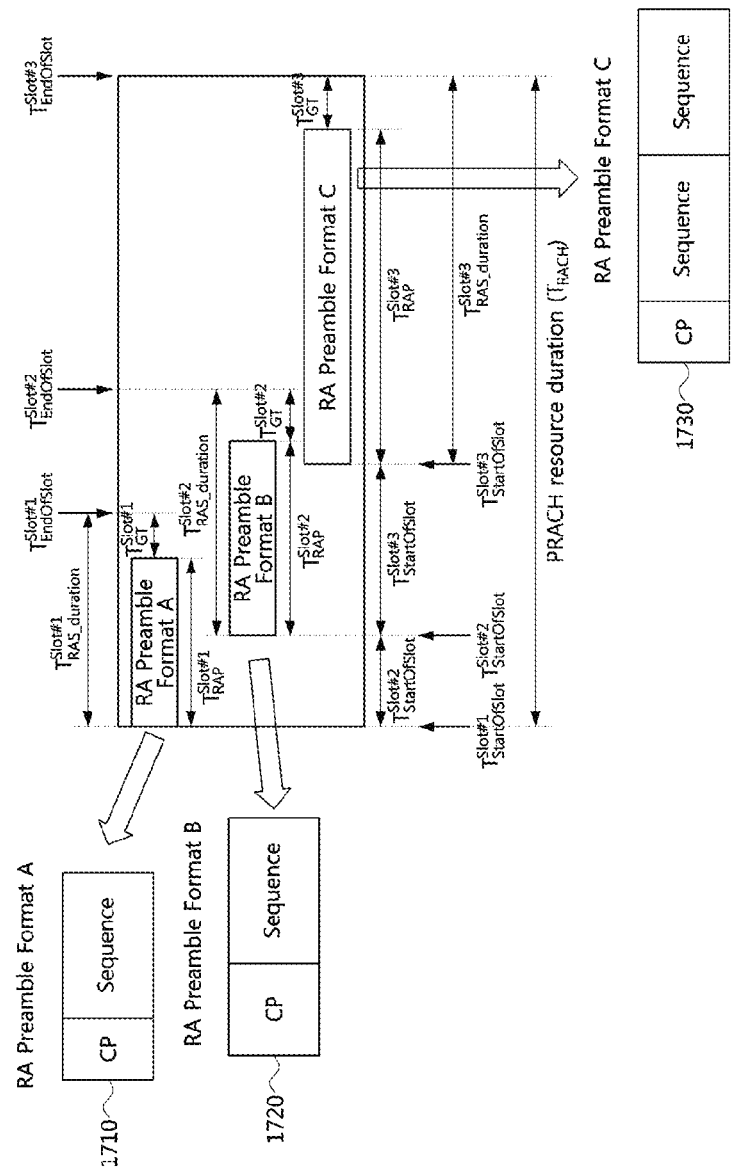
FIG. 17 is a conceptual diagram illustrating a method of applying multiple access slots to various radio channel environments according to another embodiment of the present disclosure.

FIG. 17 is a conceptual diagram illustrating a method of applying multiple access slots to various radio channel environments according to another embodiment of the present disclosure.

Referring to FIG. 17, illustrated is an embodiment in which three access slots (n=3) are configured in an arbitrary PRACH in the FDD transmission mode and different random access preamble formats are applied to the respective access slots. The PRACH multi-access slot configuration method in the FDD transmission mode of FIG. 17 may be also applicable to the TDD transmission mode. Also, the number of access slots and the random access preamble formats of the respective access slots may be variably changed according to the system scheme.

In order to configure different random access preamble formats for the respective random access preambles, the size of each access slot may be configured differently. Referring to FIGS. 14A to 14D, a random access preamble format A may be applied to a first access slot 1410, a random access format B may be applied to a second access slot 1420, and a random access preamble format C may be applied to a third access slot 1430.

The receiving side (base station) may identify positions of the respective random access preambles in the respective access slots, to which different preamble formats are applied, by referring to the starting positions $T_{StartOfSlot}^{Slot\ \#\ i}$ and the occupation length $T_{RAS\_duration}^{Slot\ \#\ i}$ of the respective access slots, and may perform detection during the PRACH occupation time $T_{RACH}$.

FIG. 18 is a conceptual diagram illustrating a method of applying multiple access slots to a multi-beam base station environment according to an embodiment of the present disclosure.

Referring to FIG. 18, illustrated is a case in which a base station controls three sector beams (e.g., beam 1, beam 2, and beam 3). Even when multiple terminals attempting random access using the same time and frequency resource among the radio resources controlled by the three sector beams exist in each beam region, interference between access slots may be minimized by using the multiple access slots according to the present disclosure. As described above, the terminal may identify a beam region in which the terminal itself is located and configuration information on PRACHs available for each beam region by referring to the system information received from the base station. Then, the terminal may transmit a random access preamble by selecting a PRACH and an access slot available for each beam. That is, as in the embodiment of FIG. 18, the terminal attempting random access may recognize that it is within a specific beam region through the system information, and then identify a PRACH and an access slot usable in the specific beam region by referring to the configuration information on the PRACH included in the system information. As described above, the configuration information on the PRACH available for each beam may be determined in advance so as to minimize inter-access slot interference in the mobile communication system, and the configuration information may vary depending on the operation environment. Then, the terminal may select the PRACH and the access slot to transmit the random access preamble. Hereinafter, a specific embodiment of FIG. 18 will be described.

The configuration information on the PRACH transmitted by the base station may further include information indicating access slots to which respective beams are mapped. For example, the PRACH configuration information may include information indicating that the beam 1 is mapped to the first access slot 1810, information indicating that the beam 2 is mapped to the third access slot 1830, and information indicating that the beam 3 is mapped to the second and fourth access slots 1820 and 1840. The information indicating the access slots to which the respective beams are mapped may be expressed in form of a bitmap. One beam may be mapped to at least one access slot and the terminal belonging to the beam may transmit a random access preamble using the access slot mapped to the beam. Also, each of neighbor beams may be mapped to an access slot spaced from one another. For example, if the beam 1 is mapped to the access slot 1810, the base station may configure the beam 2 adjacent to the beam 1 to be mapped to the access slot 1830 spaced apart from the first access slot 1810. It is possible to minimize the interference between the access slots allocated to the respective beams in the base station through the method of allocating minimum separation distance between access slots. The minimum separation distance may vary as determined by the applicable radio communication system.

In the case of FIG. 18, a terminal attempting to transmit a random access preamble using the first access slot 1810 may be a terminal in the region of the beam 1, receive, through the beam 1, system information including configuration information on a PRACH that can be transmitted through the region of the beam, identify a specific PRACH and a specific access slot (e.g., 1810 in the present embodiment) using the system information, and transmit the random access preamble using the specific PRACH and specific access slot. Likewise, a terminal located in the region of the beam 2 in the embodiment of FIG. 18 may transmit a random access preamble using the third access slot 1830. Also, a terminal located in the region of the beam 3 may transmit a random access preamble using the second access slot 1820 and the fourth access slot 1840.

The number and positions of access slots available for each beam and their usage related parameters may vary depending on the operation environment of the mobile communication system. The format of the random access preamble transmitted through the access slot may also be varied for each base station and for each sector beam. Hereinafter, a case where a plurality of base stations interoperate to operate a terminal attempting random access using the same time and the same frequency resources will be described.

FIG. 19 is a conceptual diagram illustrating a method of applying multiple access slots to a multi-beam base station environment according to another embodiment of the present disclosure.

Referring to FIG. 19, illustrated in a case in which a plurality of neighbor base stations (e.g., base station 1 and base station 2) receive random access preambles from terminals through the same time and frequency radio resources.

In the case of a mobile communication system, there is coordinated multi-point transmission and reception (CoMP) which is a cooperative transmission method, as a method of interference control technology between multiple cells. In the vicinity of the center of the cell, it is possible to increase the data rate by supporting additional antenna ports for each cell. However, since the cell edge is greatly influenced by the interference from neighboring cells, it is difficult to increase the data rate. Also, in order to provide high-speed data service even in a dense region, frequency reuse techniques using small cells such as pico cells or femto cells in the area of macro cells have been popularized. Even in this case, the CoMP technique is used as one of the effective interference control methods between transmission points, such as adjacent base stations.

In the embodiment of FIG. 19, the neighbor base stations 1 and 2 may cooperate with each other to allocate available access slots for each beam of the base station, while using the same time and the same frequency resources, and transmit the allocated access slots to the terminals in its own area.

For example, when cooperative communications between the base station 1 and the base station 2 are performed, configuration information on a PRACH to be used commonly by the base station 1 and the base station 2 may be set. The base station 1 and the base station 2 may exchange control messages through an X2 interface so that the configuration information on the PRACH can be set. Alternatively, the configuration information on the PRACH for the base station 1 and the base station 2 may be set by a core network (e.g., MME, S-GW, P-GW) to which the base station 1 and the base station 2 are connected. In this case, the core network (e.g., MME, S-GW, P-GW) may transmit the configuration information on the PRACH to each of base station 1 and base station 2. The configuration information transmitted by the base stations 1 and 2 may further include information indicating access slots to which the respective beams are mapped.

The configuration information on the PRACH may include information indicating that the beam 1-1 of the base station 1 is mapped to the first access slot 1910, information indicating that the beam 1-2 of the base station 1 is mapped to the third access slot 1930, information indicating that the beam 2-1 of the base station 2 is mapped to the second access slot 1920, and information indicating that the beam 2-2 of the base station is mapped to the third access slot 1940. The information indicating the access slots to which the respective beams are mapped may be expressed in form of a bitmap. One beam may be mapped to at least one access slot and the terminal belonging to the beam may transmit a random access preamble using the access slot mapped to the beam. Also, each of the beams belonging to a base station may be mapped to an access slot spaced from one another. For example, if the beam 1-1 is mapped to the first access slot 1910, the base station 1 may configure the beam 1-2 to be mapped to the third access slot 1930 spaced apart from the first access slot 1910. If the beam 2-1 is mapped to the second access slot 1920, the base station 2 may configure the beam 2-2 to be mapped to the fourth access slot 1940 spaced apart from the second access slot 1920.

For example, a terminal belonging to the base station 1 may receive configuration information on the PRACH which the terminal can use through system information by using an omni-directional beam or the sector beam 1-1 or 1-2. In the embodiment of FIG. 19, a terminal located in the region of the beam 1-1 of the base station 1 may transmit a random access preamble through the first access slot 1910 identified through the received system information. Likewise, a terminal located in the region of the beam 1-2 of the base station 1 may transmit a random access preamble through the third access slot 1930 identified through the received system information. Also, a terminal located in the region of the beam 2-1 of the base station 2 may transmit a random access preamble through the second access slot 1920 identified through the received system information, and a terminal located in the region of the beam 2-2 of the base station 2 may transmit a random access preamble through the fourth access slot 1940 identified through the received system information. The PRACH and the access slot usable for the base station and the beam are not limited to the above case, but may be changed according to the operation environment of the mobile communication system and the CoMP operation scheme. The format of the random access preamble transmitted through the access slot may also be varied for each base station and for each sector beam.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving system information including configuration information on a physical random access channel (PRACH) slot composed of a plurality of access slots from a first base station;
   selecting one access slot among the plurality of access slots based on the configuration information; and
   transmitting a random access preamble to the first base station through the one access slot,
   wherein a radio frame comprises a plurality of subframes in the communication system, each of the plurality of subframes comprises one or more normal slots, and one or a plurality of PRACH slots for random access are allocated among the one or more normal slots in a subframe indicated by the configuration information,
   wherein the plurality of access slots are used for transmission of random access preambles in the PRACH slot, and each of the plurality of access slots is overlapped in a time domain with at least one other access slot of the plurality of access slots, and
   wherein the configuration information further includes information indicating starting positions of the plurality of access slots, a common duration which is commonly applied to each of the plurality of access slots or a duration which is individually applied to each of the plurality of access slots, and a number of the plurality of access slots in the PRACH slot.

2. The operation method according to claim 1, further comprising:
   receiving a random access response from the first base station in response to the random access preamble; and
   transmitting a signaling message to the first base station by referring to the random access response.

3. The operation method according to claim 1, wherein the configuration information includes, for each of at least one among an omni-directional beam, a sector beam, and a spot beam, a physical resource allocation information for the PRACH slot and information on configuration of a plurality of access slots within the PRACH slot.

4. The operation method according to claim 1, wherein the configuration information further includes information indicating formats of the random access preambles transmitted through the plurality of access slots.

5. The operation method according to claim 1, wherein the configuration information further includes offsets indicating differences between the starting positions of the plurality of access slots.

6. The operation method according to claim 5, wherein an offset is allocated to be equal to or larger than a cyclic shift offset, the cyclic shift offset is a unit length of cyclic shifts of a preamble sequence applied to the random access preamble, and the cyclic shift offset is indicated by the configuration information.

7. The operation method according to claim 1, wherein, when the first base station supports a plurality of beams, the configuration information on the PRACH slot further includes information indicating one or more access slots mapped to one or more of the plurality of beams.

8. The operation method according to claim 1, wherein the configuration information on the PRACH slot is configured through coordination of the first base station and a second base station, and used commonly by the first base station and second base station.

9. An operation method of a first base station in a communication system, the operation method comprising:
   generating system information including configuration information on a physical random access channel (PRACH) slot composed of a plurality of access slots;
   transmitting the system information; and
   receiving a random access preamble through each of the plurality of access slots from a terminal,
   wherein a radio frame comprises a plurality of subframes in the communication system, each of the plurality of subframes comprises one or more normal slots, and one or a plurality of PRACH slots for random access are allocated among the one or more normal slots in a subframe indicated by the configuration information,
   wherein the plurality of access slots in the PRACH slot are used for transmission of random access preambles and each of the plurality of access slots is overlapped in a time domain with at least one other access slot of the plurality of access slots, and
   wherein the configuration information further includes information indicating starting positions of the plurality of access slots, a common duration which is commonly applied to each of the plurality of access slots or a duration which is individually applied to each of the plurality of access slots, and a number of the plurality of access slots in the PRACH slot.

10. The operation method according to claim 9, wherein the configuration information includes, for each of at least one among an omni-directional beam, a sector beam, and a spot beam, a physical resource allocation information for a PRACH slot and information on configuration of a plurality of access slots within the PRACH slot.

11. The operation method according to claim 9, wherein the configuration information further includes information indicating formats of the random access preambles transmitted through the plurality of access slots.

12. The operation method according to claim 9, wherein the configuration information further includes offsets indicating differences between the starting positions of the plurality of access slots.

13. The operation method according to claim 9, wherein the offset is allocated to be equal to or larger than a cyclic shift offset, the cyclic shift offset is a unit length of cyclic shifts of a preamble sequence applied to the random access preamble, and the cyclic shift offset is indicated by the configuration information.

14. The operation method according to claim 9, wherein, when the first base station supports a plurality of beams, the configuration information on the PRACH slot further includes information indicating one or more access slots mapped to one or more of the plurality of beams.

15. An operation method of a terminal in a communication system, the operation method comprising:
receiving system information including configuration information on a physical random access channel (PRACH) slot composed of a plurality of access slots from a first base station;
selecting one access slot among the plurality of access slots based on the configuration information; and
transmitting a random access preamble to the first base station through the one access slot,
wherein a radio frame comprises a plurality of subframes in the communication system, each of the plurality of subframes comprises one or more normal slots, and one or a plurality of PRACH slots for random access are allocated among the one or more normal slots in a subframe indicated by the configuration information,
wherein the plurality of access slots are used for transmission of random access preambles in the PRACH slot, and the configuration information includes information indicating a starting point of a first access slot among the plurality of access slots, a number of the plurality of access slots, and a common duration which is commonly applied to each of the plurality of access slots or a duration which is individually applied to each of the plurality of access slots, and a number of the plurality of access slots in the PRACH slot.

16. The operation method according to claim 15, wherein the configuration information further includes information indicating formats of the random access preambles transmitted through the plurality of access slots.

17. The operation method according to claim 15, wherein starting positions of any two access slots of the plurality of access slots have an offset equal to or larger than a cyclic shift offset, which is a unit length of cyclic shifts used to generate the random access preambles, and the cyclic shift offset is indicated by the configuration information.

18. The operation method according to claim 15, wherein the configuration information further includes a physical resource allocation information for the PRACH slot and information on configuration of the plurality of access slots within the PRACH slot.

19. The operation method according to claim 15, wherein, when the first base station supports a plurality of beams, the configuration information on the PRACH slot further includes information indicating one or more access slots mapped to one or more of the plurality of beams.

* * * * *